(12) United States Patent
Arazi et al.

(10) Patent No.: US 11,899,235 B2
(45) Date of Patent: Feb. 13, 2024

(54) DISPLAY ILLUMINATION OPTICS

(71) Applicant: ELBIT SYSTEMS LTD., Haifa (IL)

(72) Inventors: Yosef Arazi, Haifa (IL); Amitay Rudnick, Haifa (IL); Assaf Levy-Beeri, Haifa (IL); Olga Resnik, Haifa (IL); Dror Oskar, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 17/299,349

(22) PCT Filed: Nov. 29, 2019

(86) PCT No.: PCT/IL2019/051315
§ 371 (c)(1),
(2) Date: Jun. 3, 2021

(87) PCT Pub. No.: WO2020/115735
PCT Pub. Date: Jun. 11, 2020

(65) Prior Publication Data
US 2022/0035089 A1    Feb. 3, 2022

(30) Foreign Application Priority Data
Dec. 5, 2018   (IL) .......................................... 263519

(51) Int. Cl.
F21V 8/00 (2006.01)
G02F 1/1362 (2006.01)
(52) U.S. Cl.
CPC ..... *G02B 6/0035* (2013.01); *G02F 1/136277* (2013.01)
(58) Field of Classification Search
CPC .................. G02B 6/0035; G02F 1/136277
See application file for complete search history.

(56) References Cited

U.S. PATENT DOCUMENTS 4,798,448 A    1/1989 van Raalte
5,764,322 A *  6/1998 Mamiya .............. G02F 1/13362
                                              349/67
(Continued)

FOREIGN PATENT DOCUMENTS

CN    103837988 A    6/2014
CN    104089221 A    10/2014
(Continued)

OTHER PUBLICATIONS

Zhang et al. "Fundamentals of phase-only liquid crystal on silicon (LCOS) devices" Light: Science & Applications (2014) 3, e213: doi: 10.1038/lsa.2014.94. Retrieved from https://www.researchgate.net/publication/281127525_Fundamentals_of_phase-only_liquid_crystal_on_silicon_LCOS_devices/citation/download on Jul. 8, 2021.

(Continued)

*Primary Examiner* — Fatima N Farokhrooz
(74) *Attorney, Agent, or Firm* — The Roy Gross Law Firm, LLC; Roy Gross

(57) ABSTRACT

Aspects of embodiments pertain to a display illumination optics for illuminating an image display device of an image generation apparatus, the display illumination optics comprising: a source illumination distributor that includes an illumination waveguide having a front surface and a back surface opposite the front surface and configured to internally direct light along a main direction, wherein the illumination waveguide is configured to distribute the luminance of input illumination light along the main direction of the display illumination optics to obtain, along the main direction, output illumination light of desired luminance.

20 Claims, 15 Drawing Sheets

(56) References Cited

U.S. PATENT DOCUMENTS

| | | | |
|---|---|---|---|
| 5,896,232 A | | 4/1999 | Budd et al. |
| 6,104,454 A | * | 8/2000 | Hiyama ............... G02B 6/0028 |
| | | | 349/96 |
| 6,234,639 B1 | | 5/2001 | Noguchi |
| 6,592,233 B1 | | 7/2003 | Parikka |
| 7,175,332 B2 | | 2/2007 | Tang |
| 7,290,917 B2 | | 11/2007 | Cho et al. |
| 7,798,660 B2 | * | 9/2010 | Itoh ..................... G02B 6/0056 |
| | | | 362/268 |
| 7,944,616 B2 | | 5/2011 | Mukawa |
| 8,279,523 B2 | * | 10/2012 | Yamada ............... G02B 27/285 |
| | | | 359/489.08 |
| 8,294,994 B1 | | 10/2012 | Kelly |
| 2003/0058382 A1 | | 3/2003 | Tanoue et al. |
| 2003/0067760 A1 | | 4/2003 | Jagt et al. |
| 2003/0128538 A1 | | 7/2003 | Shinohara et al. |
| 2005/0123229 A1 | * | 6/2005 | Huck .................. G02F 1/13362 |
| | | | 385/11 |
| 2006/0152931 A1 | * | 7/2006 | Holman ............... G02B 27/126 |
| | | | 257/E25.02 |
| 2008/0084600 A1 | | 4/2008 | Bita et al. |
| 2009/0052046 A1 | | 2/2009 | Amitai |
| 2011/0141395 A1 | | 6/2011 | Yashiro |
| 2011/0199352 A1 | | 8/2011 | Wheatley et al. |
| 2014/0003762 A1 | | 1/2014 | Macnamara |
| 2015/0153503 A1 | | 6/2015 | Leu |
| 2015/0226909 A1 | * | 8/2015 | Li ........................ G02B 6/0038 |
| | | | 362/19 |
| 2015/0260995 A1 | * | 9/2015 | Mukawa ............... G02B 23/14 |
| | | | 345/8 |
| 2015/0268399 A1 | | 9/2015 | Futterer |
| 2018/0039082 A1 | * | 2/2018 | Amitai ................. G02B 27/148 |

FOREIGN PATENT DOCUMENTS

| | | |
|---|---|---|
| CN | 104238250 A | 12/2014 |
| CN | 104656258 A | 5/2015 |
| CN | 104656259 A | 5/2015 |
| CN | 104728684 A | 6/2015 |
| CN | 105425395 A | 3/2016 |
| JP | 2003331626 A | 11/2003 |
| JP | 2012094411 A | 5/2012 |
| KR | 100948618 B1 | 3/2010 |
| WO | 2007062098 A2 | 5/2007 |
| WO | 2009006640 A1 | 1/2009 |
| WO | 2009109965 A2 | 9/2009 |
| WO | 2013012484 A2 | 1/2013 |
| WO | 2013019371 A1 | 2/2013 |
| WO | 2013043252 A1 | 3/2013 |
| WO | 2020115735 A1 | 6/2020 |

OTHER PUBLICATIONS

"File: Google Glass Explorer Optics Schematic.png" (2014). Retrieved from https://commons.wikimedia.org/wiki/File:Google_Glass_Explorer_Optics_Schematic.png, on Jul. 8, 2021.
Dr. Raymond M. Soneira. "Display Color Gamuts Shoot-Out NTSC to Rec.2020." (2016). Retrieved from http://www.displaymate.com/Display_Color_Gamuts_1.htm on Jul. 8, 2021.
Miles, M.W. Interferometric Modulation: A MEMS Based Technology for the Modulation of Light. IS&T's 50th annual conference (1997). Retrieved from https://www.imaging.org/site/PDFS/Papers/1997/IST-0-4/191.pdf on Jul. 8, 2021.
International Search Report and Written Opinion for Application No. PCT/IL2019/051315, dated Mar. 5, 2020, 12 pages.
Machine translation of Israel 2nd Office action dated Jun. 23, 2020 regarding IL priority application 263519.
Machine translation of Israel 1st Office Action dated Jun. 18, 2019 regarding IL priority application 263519.
"Israeli Search report dated Jun. 18, 2019 regarding IL priority application 263519."
"Fundamentals of phase-only liquid crystal on silicon (LCOS) devices" Light: Science & Applications (2014) 3, e213: doi: 10.1038/lsa.2014.94.
https://commons.wikimedia.org/wiki/File:Google_Glass_Explorer_Optics_Schematic.png, published on Feb. 6, 2014.
http://www.displaymate.com/Display_Color_Gamuts_1.htm, published on 2016.
"Interferometric Modulation: A MEMS Based Technology for the Modulation of Light" (M.W. Miles, IS&T's 50th annual conference).
"Israeli Search report dated Jun. 18, 2019".
"Machine translation of 3rd Office Action dated Mar. 25, 2021 regarding Israeli priority patent application 263519".
Notice of Acceptance of Patent Application for corresponding Israeli Application No. IL 263519, dated Mar. 17, 2022, 4 pp.

* cited by examiner

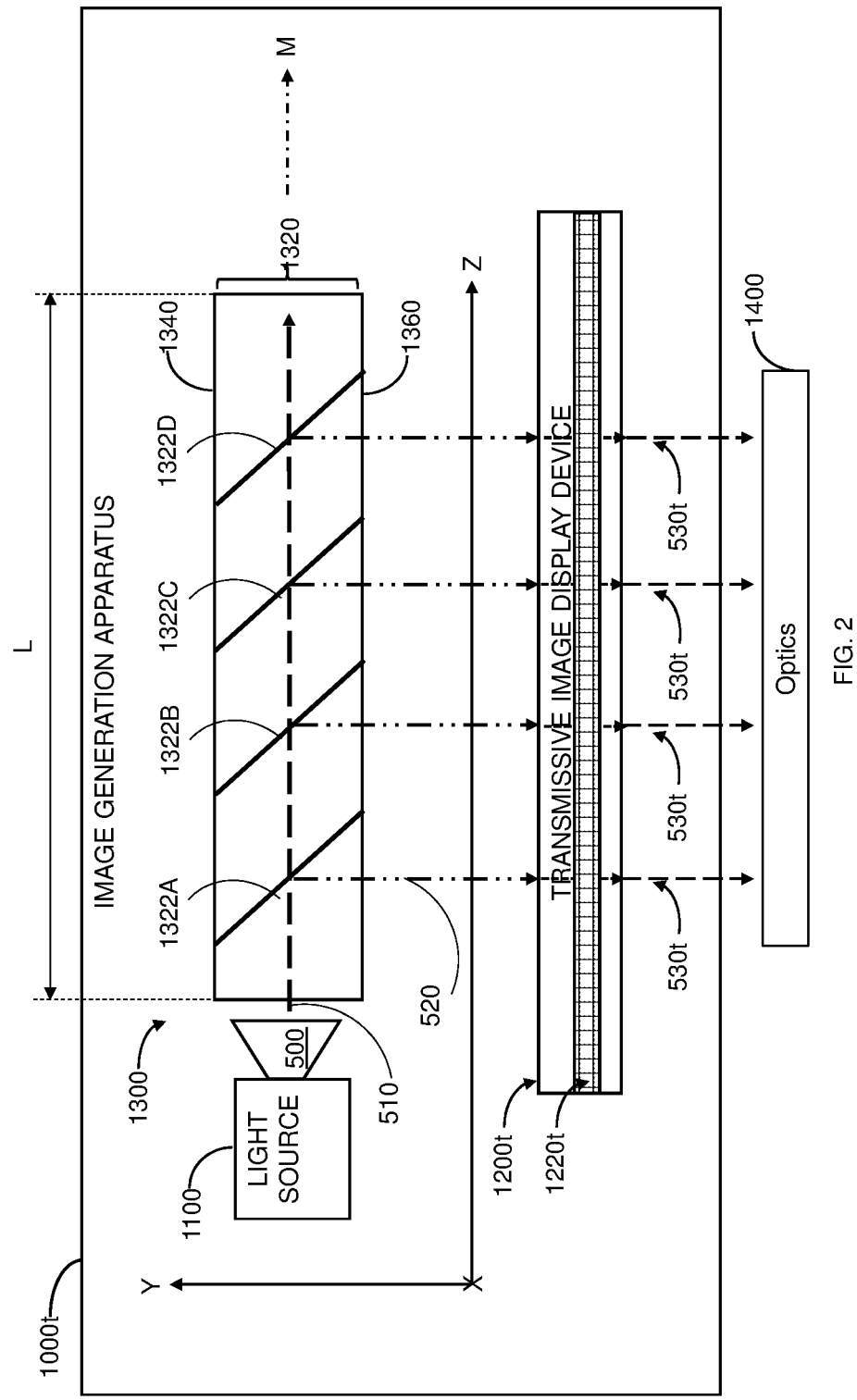

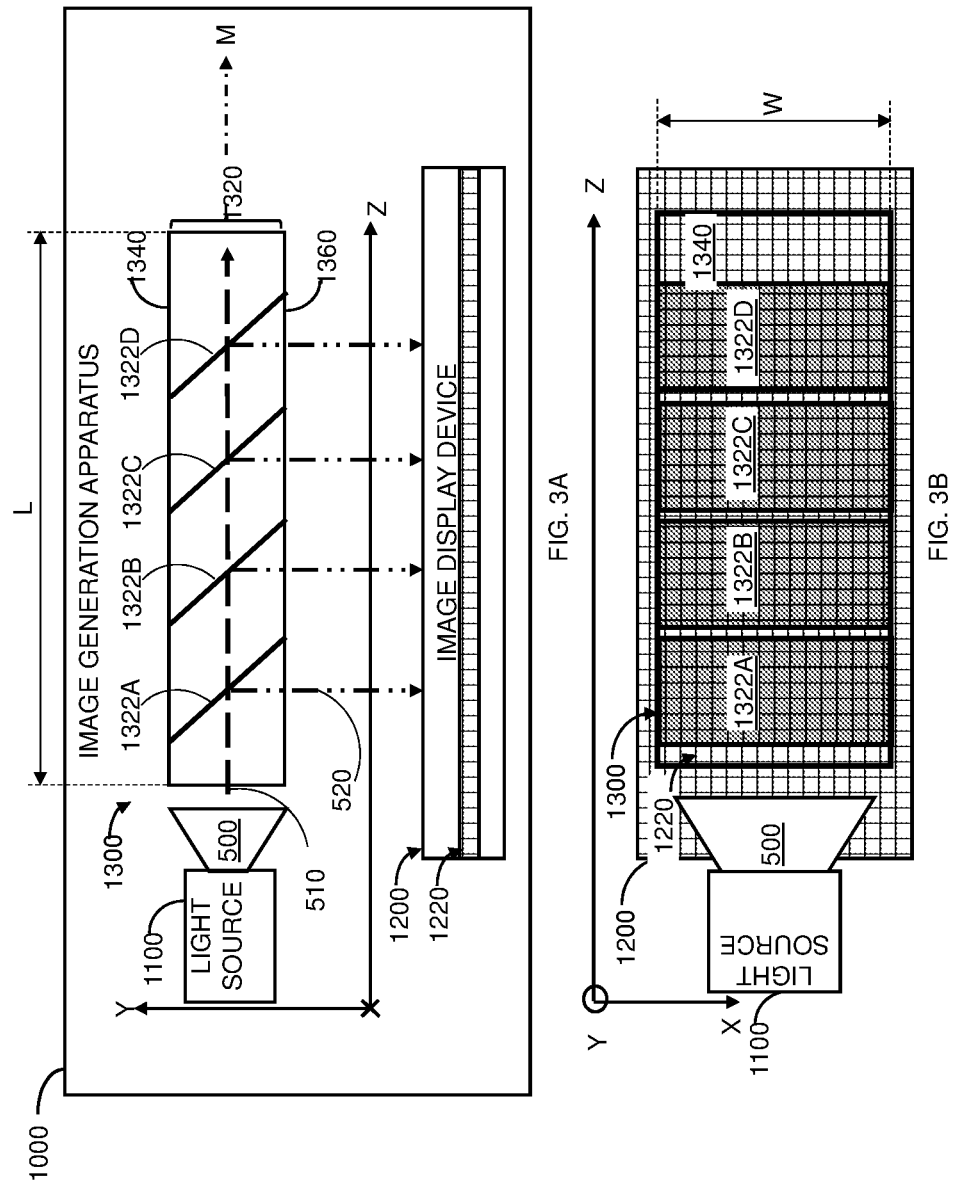

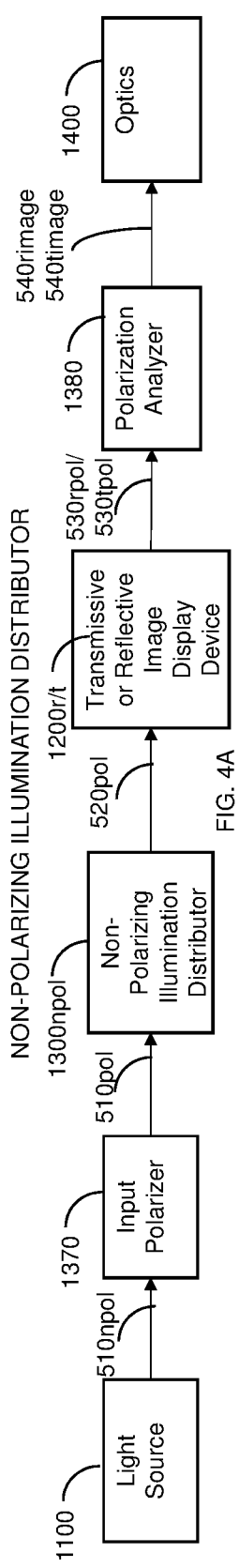
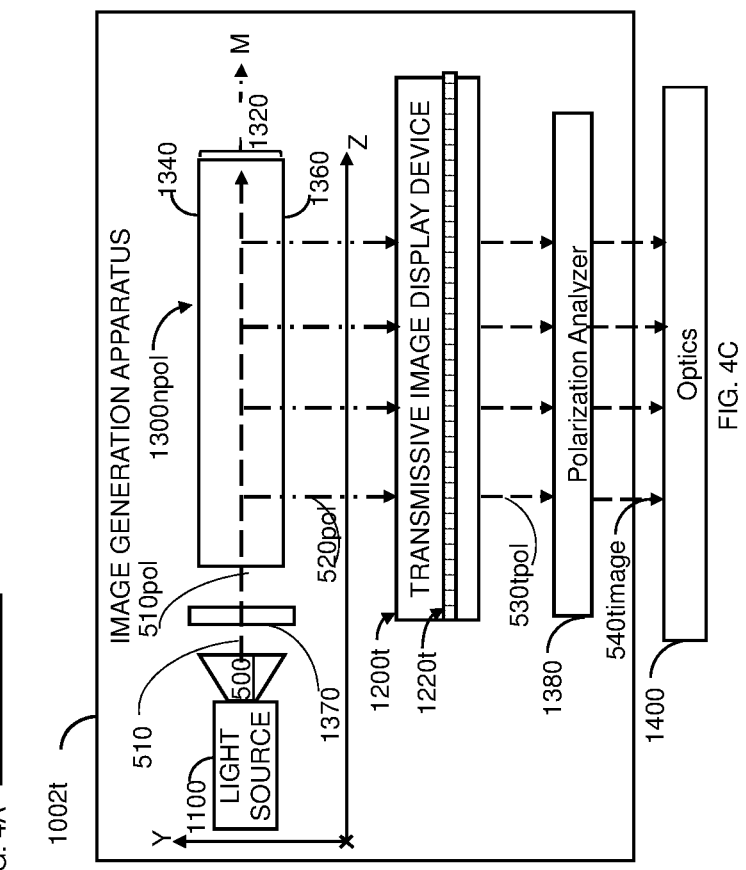
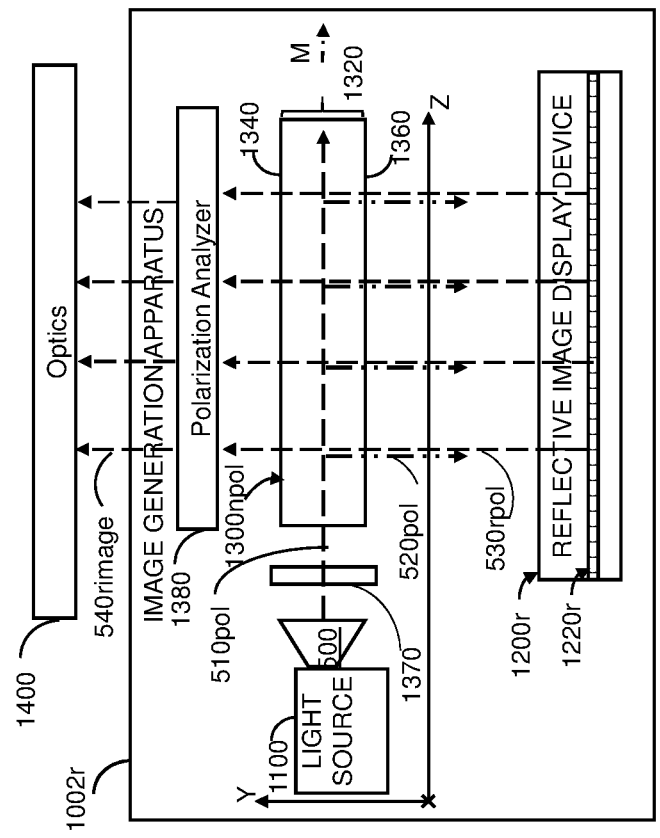
FIG. 4A
FIG. 4C
FIG. 4B

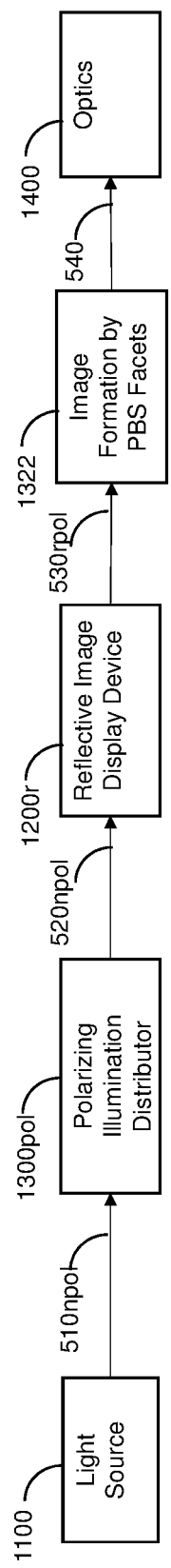
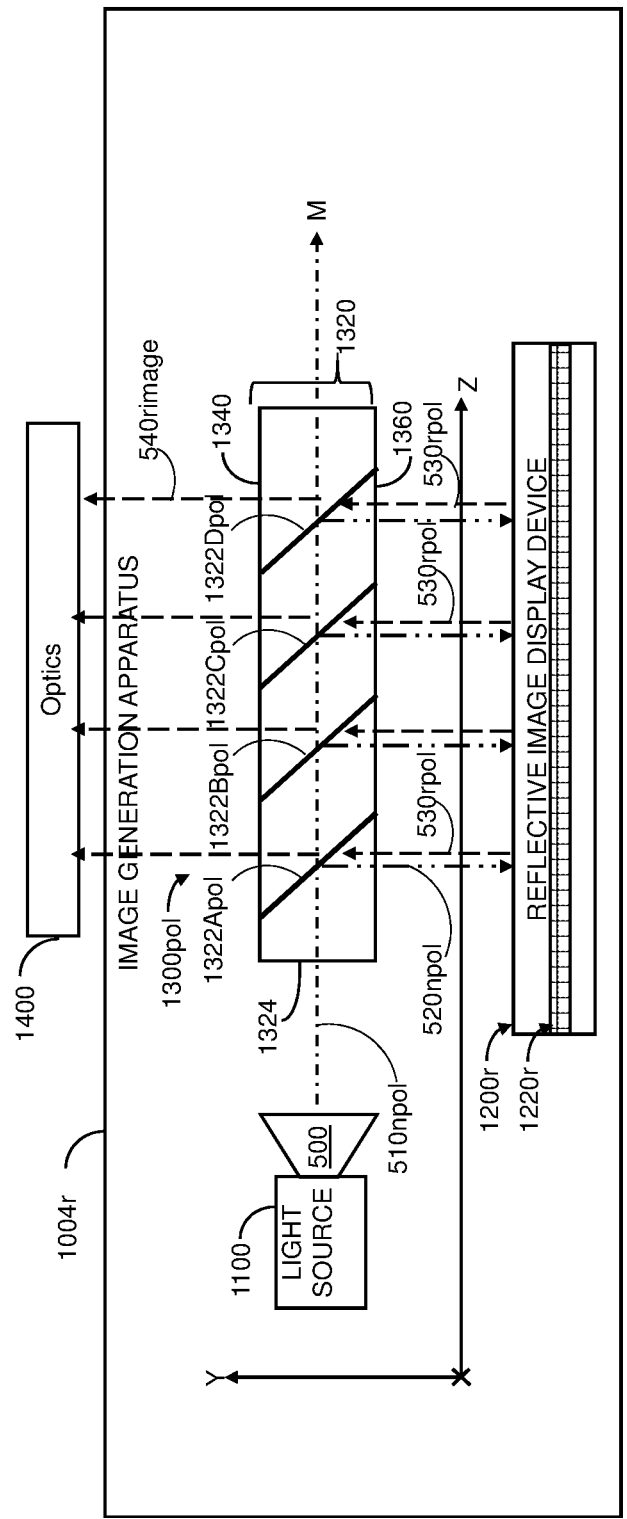
FIG. 6A
FIG. 6B

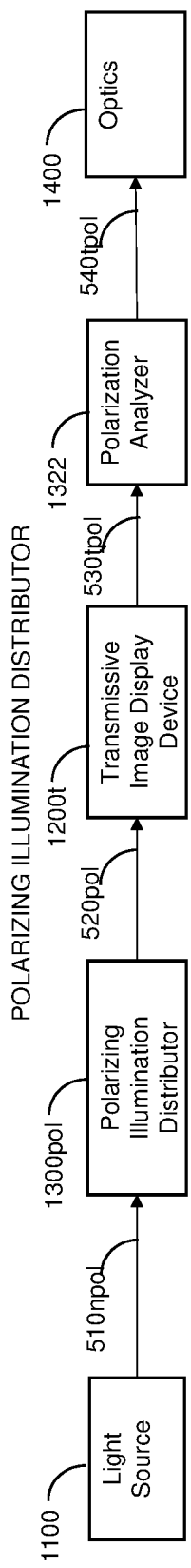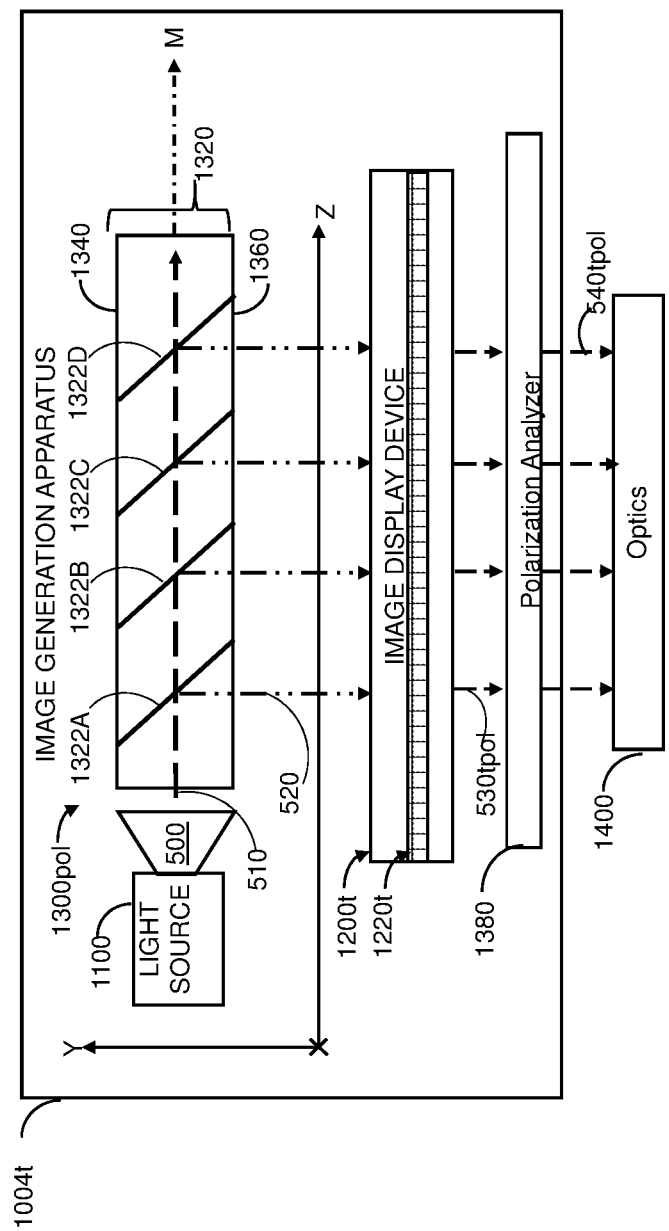

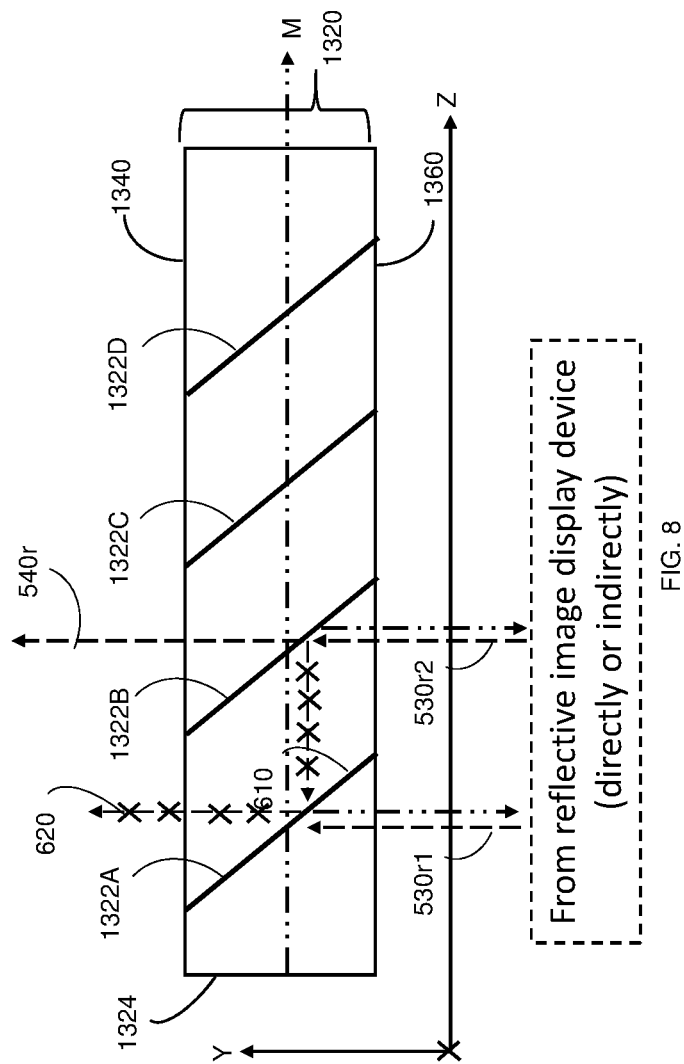

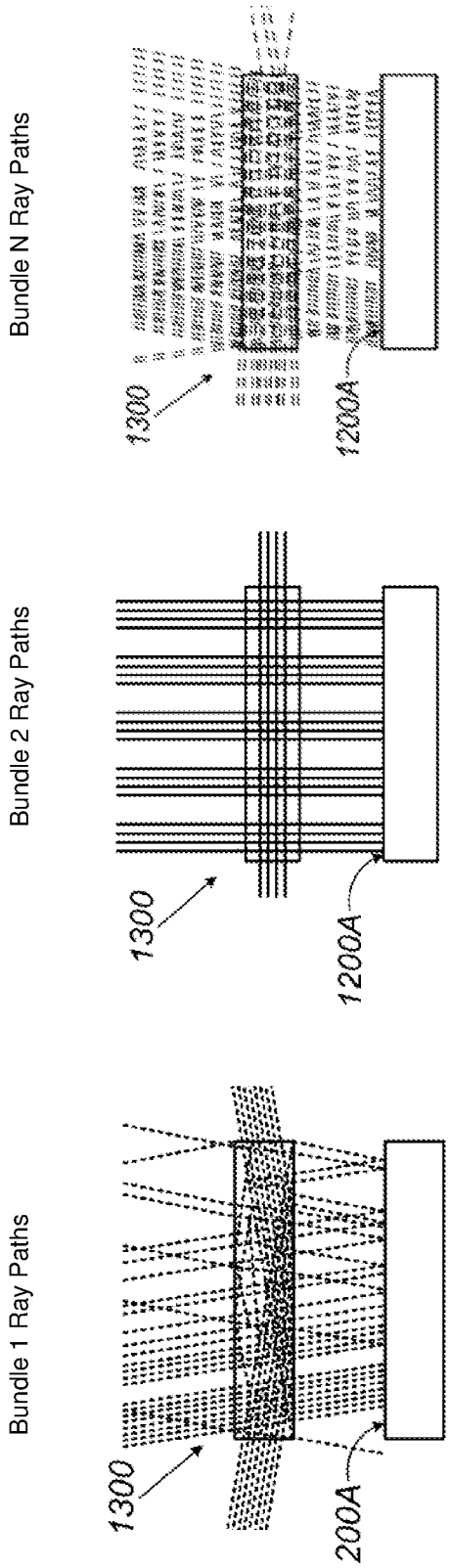

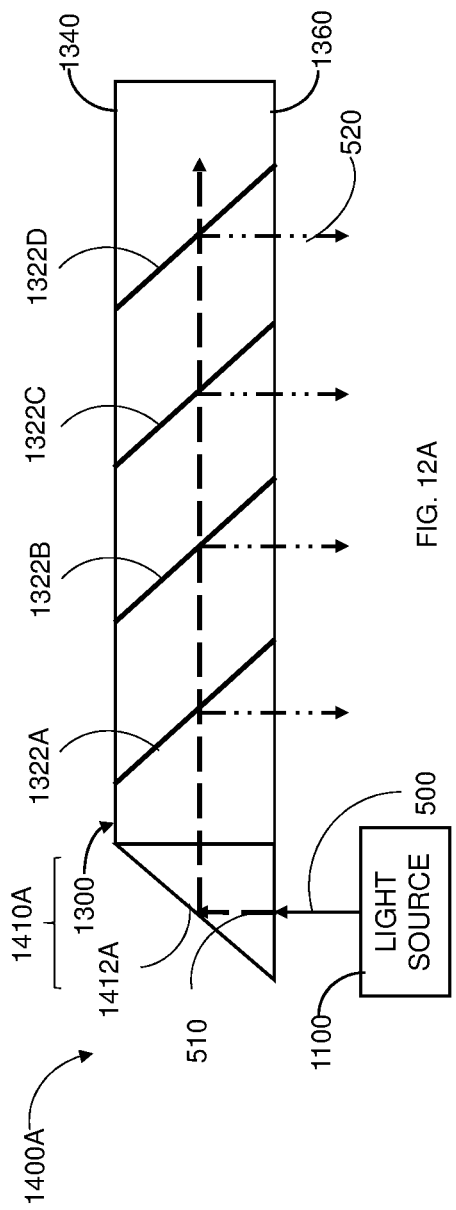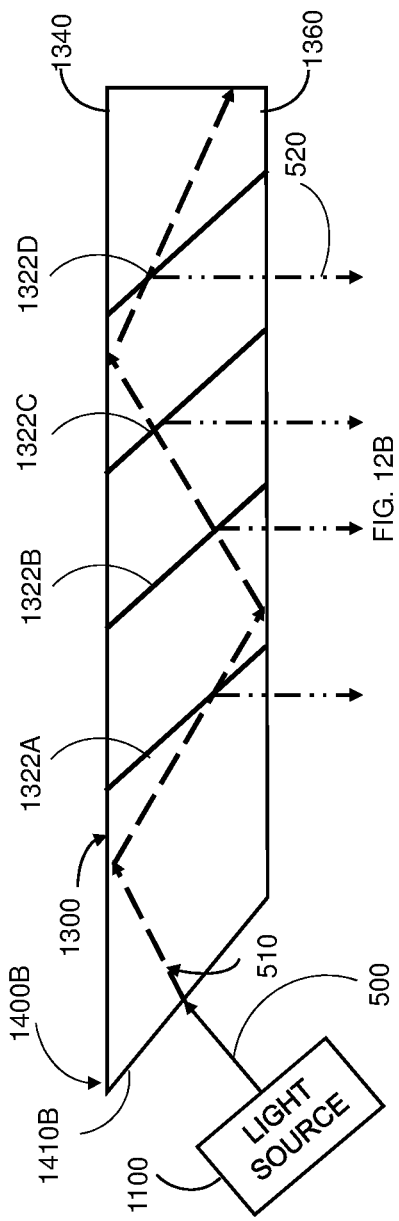

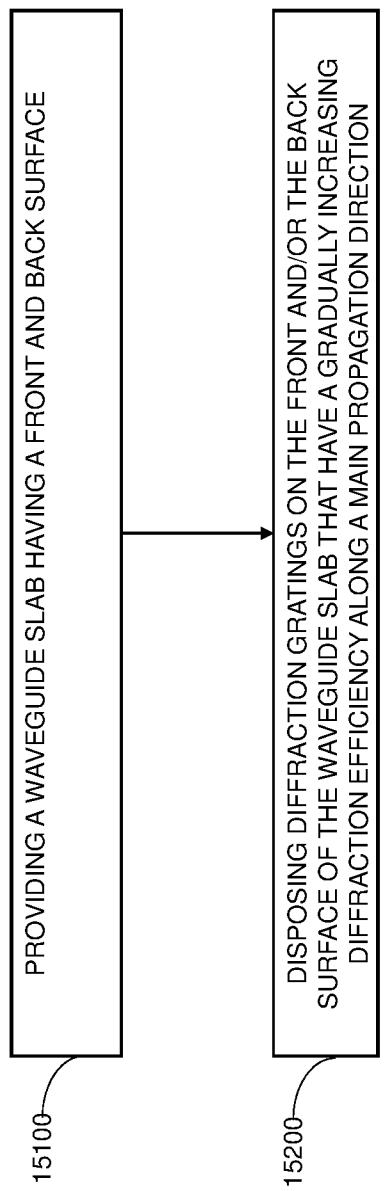

DISPLAY ILLUMINATION OPTICS

CROSS REFERENCE TO RELATED APPLICATIONS

This application is a National Phase of PCT Patent Application No. PCT/IL2019/051315 having International filing date of Nov. 29, 2019, which claims the benefit of priority of Israel Patent Application No. IL 263519, filed Dec. 5, 2018, the contents of which are all incorporated herein by reference in their entirety.

TECHNICAL FIELD

The present disclosure relates in general to the field of optics, and in particular but not exclusively, to projection image displays.

BACKGROUND

Projection image displays are employed in a variety of applications including, for example, rear-projection video systems and head-mounted displays (HMDs). HMDs can for example be configured to display to a user a computer-generated image (CGI) over a real-world view for realizing augmented reality. Other types of HMDs display only the CGI to the user for immersing the user in a virtual environment to create a virtual reality.

HMDs can, for example, facilitate the piloting of an aircraft by displaying to the pilot a variety of flight control information. Other application fields include video games, healthcare-related applications such as providing assistance in surgical procedures, and the like.

The description above is presented as a general overview of related art in this field and should not be construed as an admission that any of the information it contains constitutes prior art against the present patent application.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 2 is a schematic side view of an image generation apparatus comprising the source illumination distributor of FIG. 1 and a transmissive image display device, according to alternative embodiments;

FIG. 3A is schematic side view of an image generation apparatus comprising the source illumination distributor and an image display device which can be reflective or transmissive, according to some embodiments;

FIG. 3B is a schematic top view of the image generation apparatus shown in FIG. 3A;

FIG. 4A is a diagram schematically illustrating an optical path in an optical display system employing a non-polarizing illumination distributor, according to some embodiments;

FIG. 4B is a schematic block diagram of an optical display system comprising an image generation apparatus employing a non-polarizing illumination distributor, according to some embodiments;

FIG. 4C is a schematic block diagram of an optical display system comprising an image generation apparatus employing a non-polarizing illumination distributor, according to some alternative embodiments;

FIG. 6A is a diagram illustrating an optical path in an optical display system employing a polarizing illumination distributor, according to some embodiments;

FIG. 6B is a schematic block diagram of an optical display system comprising an image generation apparatus employing a polarizing illumination distributor, according to the embodiment of FIG. 6A;

FIG. 7A is a diagram schematically illustrating an optical path in an optical system employing a polarizing illumination distributor, according to additional embodiments;

FIG. 7B is a schematic block diagram of an optical display system comprising an image generation apparatus employing a polarizing illumination distributor, according to the embodiment of FIG. 7A;

FIG. 8 is a schematic illustration of crosstalk in an illumination distributor, according to some embodiments;

FIGS. 11A-C are schematic illustrations of a selection of collimated light ray bundles propagating through the illumination distributor and their reflection from the reflective image display device of the image generation apparatus, according to some embodiments;

FIGS. 12A-B are schematic illustrations of a light coupling structures of a source illumination distributor, according to some embodiments;

FIG. 15 is a flowchart of a method for manufacturing a source illumination distributor, according to some other embodiments.

DETAILED DESCRIPTION

Figure 1:
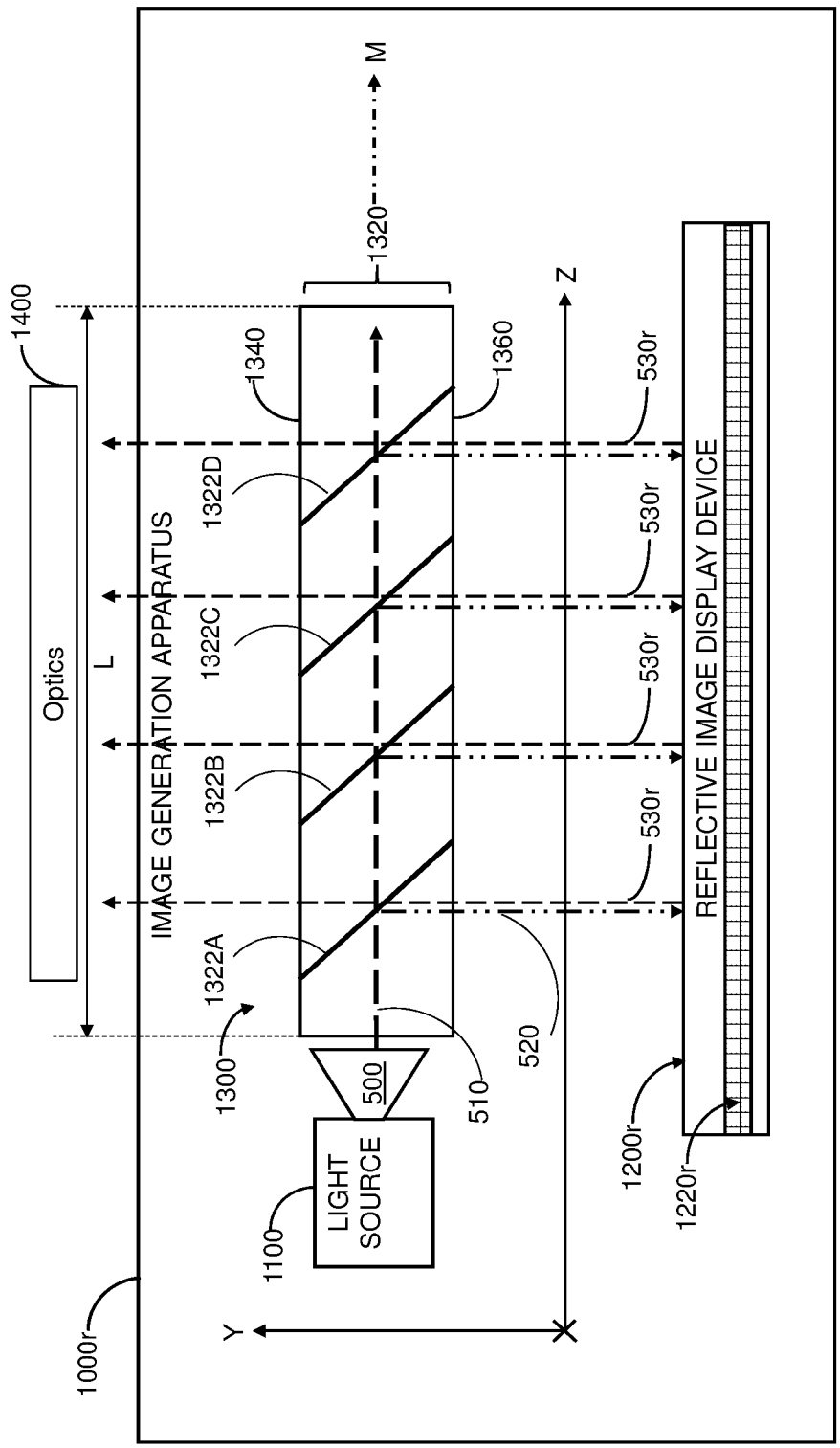
FIG. 1 is a schematic side view of an image generation apparatus comprising a source illumination distributor and a reflective image display device, according to some embodiments.

The following description of image generation apparatuses and methods that may be employed by a Head-Mounted Display (HMD) is given with reference to particular examples, with the understanding that such devices and methods are not limited to these examples.

Image generation apparatuses may be employed by optical display systems such as, for example, HMDs, to generate image-bearing light and to project the image-bearing light towards pupil forming optics that is configured and arranged relative to the image generation apparatus to form an input pupil of the image-bearing light. Image-bearing light can for example be projected towards a viewing region at finite conjugates (e.g., to display a user only computer-generated image for immersing the user in a virtual environment to create a virtual reality), or at infinite conjugates (e.g., for realizing augmented reality). The term "image-bearing light" as used herein refers to light that may carry useful user-processable information including, for example, synthetic image information, symbology (e.g., vehicle pitch, roll, azimuth, position, speed), and/or the like, for example, to enhance a user's situational awareness, e.g., while controlling an aircraft and/or any other type of vehicle. Synthetic image information can for example include an artificial horizon, a 3D (e.g., perspective view) representation of terrain, e.g., using a grid with contour lines; and/or the like. In some embodiments, the user wearing an HMD may be onboard the vehicle to facilitate control thereof, or located remotely from the vehicle to facilitate remote vehicle control.

An image generation apparatus of an optical display system can comprise a light source, an image display device and display illumination optics, e.g., for illuminating the display device with light emitted by the light source at a desired (e.g., uniform) illumination distribution. For example, the display illumination optics may be configured such that an image plane comprising light modulating arrangements is lit with light of desired (e.g., uniform) illuminance. In order to achieve a desired illuminance, the display illumination optics may be configured to (e.g., evenly) distribute the luminance of input illumination light along the main direction of propagation of the display illumination optics to provide, in (e.g., orthogonal) deflection relative to the main direction, output illumination light of correspondingly desired luminance to achieve, at an image display device, a desired (e.g., uniform) illumination distribution.

It is noted that the terms "uniform" and "evenly" as well as grammatical variations thereof also includes the term "substantially uniform" and "substantially evenly", encompassing an inclusive range of −10% to +10%, −20% to +20%, or −30% to +30% of the respective magnitude or value.

Unless otherwise specified, the terms 'about' and/or 'close' with respect to a magnitude or a numerical value may imply to be within an inclusive range of −10% to +10% of the respective magnitude or value.

The display illumination optics comprises a source illumination distributor configured to deflect (e.g., reflecting) or otherwise direct input illumination light that is emitted by the light source, from a first optical path with a first optical axis to a second optical path with a second optical axis towards the image display device. The direction of the first optical axis can be different from the second optical axis. Optionally, the first optical axis is perpendicular (e.g., substantially perpendicular) to the second optical axis.

In some embodiments, the input illumination light may include, for example, white light generated by any suitable (e.g., primary) color sources including, for example, LED or Laser light. Optionally, the input illumination light may be capable of achieving a desired color gamut (e.g., NTSC, NTSC, Rec.709,DCI-P3, Adobe RGB color space, Rec. 2020, PAL, SECAM, etc.). Primary color sources can include, for example, Red-Green-Blue (RGB). In some embodiments, the input illumination light may have a comparatively narrow spectrum. A narrow spectrum source with a source for each primary color, like RGB lasers, may be employed to produce white light of comparatively wide color gamut. In general, the narrower the spectrum of each one of the RGB components, the wider the gamut can be.

In some embodiments, the light source may comprise a LED-based or other broadband light source for generating white light to be launched into the illumination distributor. The white light emanating from the illumination distributor towards the image display device may be modulated thereby to generate and project image bearing light towards additional optics (e.g., pupil forming optics, eyes of a viewer). The image display device may filter and/or otherwise modulate the white light incident to generate the image bearing light. In some embodiments, the light source may comprise a laser-based light source that is configured to emit laser light or any other narrow-spectrum light source. In some embodiments, the narrow-spectrum light source may emit narrow-band light of a single color (e.g., green).

As mentioned herein earlier, image display device may act as a light modulator (e.g., light valve) on illumination light incident thereon for responsively generating image-bearing light. The image display device can be implemented, for example, by a transmissive display or a reflective display. The transmissive and reflective displays may be implemented as transmissive or reflective microdisplays.

Examples of a reflective image display devices include LCOS (Liquid Crystal On Silicon)-based displays, and a digital micromirror device (DMD)-based displays. DMD-reflection angles may be selected to such to avoid reintroduce light into optical path of output illumination light. An example implementation of transmissive (micro-) displays is based on ferroelectric liquid crystals. Optionally, the source illumination distributor may be configured to direct collimated light towards the image display device.

In an embodiment, the source illumination distributor includes an illumination waveguide (also: illumination waveguide body) having a front surface and a back surface opposite the front surface and is configured to internally direct light along a main direction of propagation. The illumination waveguide comprises a plurality of reflective surfaces that are configured to let pass therethrough a portion of the illumination light traveling along the main direction and further configured to reflect a portion of light that is coupled inside the illumination waveguide, through the front surface (also: output surface) thereof towards the image display device for illumination thereof. Optionally, each one of the partially reflective surface may, for example, function as beam splitters. Optionally, the illumination waveguide may comprise an array of beam splitters (e.g., a plurality of partially reflective surfaces arranged in series) that are sequentially arranged or incorporated in the illumination waveguide with respect to the main direction of the illumination light propagating in the illumination waveguide. Optionally, the beam splitters may be polarizing beam splitters, sometimes referred herein as "PBS". Polarizing beam splitters may be implemented in various ways including, for example, as Glan-Thompson beamsplitters or by employing suitable surface coatings such that light reflection/transmission ratio of S and P-polarization is altered along the main propagation direction. In an embodiment, the plurality of partially reflective surfaces are slanted relative to the front and back surfaces of the illumination waveguide. In some embodiment, the front and back surface of the illumination waveguide are parallel (e.g., substantially parallel). In some embodiments, the front and front and back surfaces of the illumination waveguide are non-parallel. In some embodiments, the front and front and back surfaces of the illumination waveguide are curved. In some embodiments, the front surface is convex and the back surface is concave. In some embodiments, the front and back surfaces are concentric. In some embodiments, both the front and back surfaces are convex. In some embodiments, both the front and back surfaces are concave. In some embodiments, the front and back surfaces of the illumination waveguide are formed as parallel (e.g., substantially parallel) curves.

Reference is now made to FIGS. 1 and 2. An image generation apparatus 1000r can comprise a light source 1100, an image display device 1200, and display illumination optics (also: source illumination distributor) 1300 for directing input illumination light 500 that is emitted by light source 1100 towards image display device 1200. Input illumination light 500 may include, for example, white light.

In an embodiment, illumination distributor 1300 may comprise an illumination waveguide 1320 having a front surface 1340 and a back surface 1360 opposite front surface 1340. Illumination waveguide 1320 is configured to internally direct waveguide-propagating illumination light 510 along a main direction M.

Input illumination light 500 launched into the illumination waveguide 1320 continues to propagate therein as waveguide-propagating illumination light 510. Illumination waveguide 1320 comprises a plurality of partially reflective surfaces 1322 (e.g., surfaces 1322A-D) that are configured to let pass therethrough a portion of waveguide-propagating illumination light 510 along the main direction M and further configured to deflect (e.g., reflect) a remaining portion of waveguide-propagating illumination light 510 towards image display device 1200 for illumination thereof. In an embodiment, the plurality of partially reflective surfaces 1322 are slanted relative to the front and back surfaces 1340 and 1360 for implementing Optical Folding Elements (OPFEs). The number N of OPFE's being employed is directly dependent (proportional) with the size of the active area and the size of the optics that must be employed to obtain desired (e.g., uniform) illumination intensity distribution incident onto the image display device. When N increases the width of each one of the OPFE's can be reduced. Optionally, the OPFEs are arranged such that light deflecting therefrom towards the image display device does not constructively interfere while propagating towards the image display device. Optionally, the OPFEs are arranged such that there are no spots along the output surface of the illumination distributor with no illumination light emanating therefrom towards the image display device.

In some embodiments, optical characteristics (e.g., dielectric properties) of one or more of the OPFEs may be vary between the front and the back surface. For instance, transmissivity of each OPFE may increase or decrease from the front to the back surface, e.g., depending on required luminance. Optionally, the average or median reflectivity of the OPFE's towards the image display device increases along the main direction, from the input facet towards the waveguide facet opposite the input facet, for example, to achieve uniform illumination of the image display device.

In some embodiments, OPFEs (polarizing or non-polarizing) may be employed in conjunction with coatings on the front and/or back surface of the illumination distributor.

In some embodiments OPFEs (polarizing or non-polarizing) may be employed in conjunction with diffraction gratings on the front and/or back surface of the illumination distributor.

At least one of the plurality of OPFEs is partially reflective and partially transmissive to waveguide-propagating illumination light 510. In the discussion that follows, an OPFE may designated with the same alphanumeric reference as a partially reflective surface, namely by "1322".

In an embodiment, the plurality of partially reflective surfaces or OPFEs 1322 (e.g., OPFEs 1322A-D) are configured deflect (e.g., reflect) portions of waveguide-propagating illumination light 510 that is propagating, e.g., in total internal reflection (TIR), through back surface 1360 as output illumination light 520 towards image display device 1200.

In some embodiments, dielectric characteristics of the OPFEs 1322 may exhibit decreasing transmissivity and increasing reflectivity along the main direction M. Hence, as the waveguide-propagating illumination light 510 propagates in illumination waveguide 1320, a subsequent OPFE may allow more light to be transmitted compared to a preceding OPFE that is located upstream in the main direction M. For example, a subsequent OPFE may allow reflecting more light out of back surface 1360 of illumination waveguide 1320 compared to the preceding OPFE located upstream in the main direction M. If the source illumination distributor is optically coupled with a transmissive display, the hindmost OPFE of the plurality of OPFEs may be non-transmissive to waveguide-propagating illumination light 510 propagating in main direction M.

Increasing reflectivity/decreasing transmissivity of the OPFEs in the main direction M described above may offset for luminance attenuation as waveguide-propagating illumination light 510 propagates through illumination waveguide 1320. This way, the portions of output illumination light 520 emanating out of back surface 1360 may exhibit along the length L an about equal luminance, e.g., to allow for desired (e.g., substantially uniform) illumination of image display device 1200. For example, for a given injected component of input illumination light 500, the illuminance of related output illumination light 520 incident onto image display device 1200 may be uniform (e.g., substantially uniform). This may for example be achieved by ensuring an uniform luminance of the related output illumination light 520 projected from the back surface 1360 towards image display device 1200. The term "light component" as used herein may refer to light which, at the time it is injected into the illumination waveguide, has certain measurable optical characteristics (e.g., wavelength and polarization).

In some embodiments, the plurality of OPFEs 1322 may have identical (e.g., substantially identical) dielectric characteristics.

In some embodiments, dielectric characteristics of the OPFEs 1322 may exhibit decreasing transmissivity and increasing reflectivity along the main direction M.

In some embodiments, one or more of the OPFEs 1322 may exhibit decreasing or increasing transmissivity from front surface 1340 to back surface 1360 of illumination waveguide 1320. This may allow, for example, reducing the number of OPFEs 1322 to achieve a desired illuminance distribution of output illumination light incident onto image display device 1200.

Image generation apparatus 1000r is configured such that output illuminating light 520 is incident onto image display device 1200 and modulated thereby to responsively generate image-bearing light 530. Accordingly, image the display device may herein also be referred to as "light modulator".

Image display device 1200 is configured to act, for example, as a (e.g., spatial) modulator on output illumination light 520 to generate image-bearing light 530. Image display device 1200 comprises, for example, light modulating arrangements 1220 that are configured to generate image-bearing light 530. Such light modulating arrangements can include, for example, reflective or transmissive active matrix Liquid Crystal Display Technology, or a DMD.

In the configuration shown in FIG. 1, at least some of output illuminating light 520 that is incident onto reflecting light modulating arrangements 1220r is modulated thereby and responsively reflected from a reflective image display device 1200r as reflected image-bearing light 530r. Reflected image-bearing light 530r may be directed, for example, towards back surface 1360 of illumination waveguide 1320 and propagate through partially reflective surfaces 1322 to emanate from front surface 1340 of illumination waveguide 1320 towards additional optics 1400. In some example implementations, additional optics 1400 is configured to generate an input pupil for the image-bearing light. Depending on the particular application, the generated input pupil image-bearing light may be expanded by pupil expansion optics (not shown). Image-bearing light of an expanded exit pupil may then be projected towards a viewing region (not shown) at finite and/or infinite conjugates. In some embodiments, additional optics 1400 may be part of image generation apparatus 1000r. In some embodiments, additional optics 1400 may be employed external to image generation apparatus 1000r.

FIG. 2 schematically illustrates an image generation apparatus 1000t of which at least some of output illuminating light 520 that is incident onto transmissive light modulating arrangements 1220t is modulated thereby and transmitted through a transmissive image display device 1200t to emanate therefrom as transmitted image-bearing light 530t. Transmitted image-bearing light 530t may be transmitted downstream towards additional optics 1400 for projection towards a viewing region (not shown).

In embodiments, the illumination waveguide comprises, for example, at least 2, at least 3, at least 4, at least 5, at least 10, or at least 20, partially reflective surfaces.

Turning now to FIGS. 3A and 3B, illumination waveguide 1320 of an image generation apparatus 1000 (comprising a reflective or transmissive image display device 1200r or 1200t) may have a length and/or width extending over a portion of the length and/or width of image display device 1200, respectively. In some embodiments, illumination waveguide 1320 may have a length and/or width extending over the entire length and/or width of image display device 1200, respectively, or beyond the entire length and/or width of the image display device 1200 to ensure entire illumination thereof. The length L and/or width W of illumination waveguide 1320 may be, for example, at least 1 cm, or at least 1.5 cm.

An image generation apparatus may employ, in some embodiments, a non-polarizing illumination distributor and, in some other embodiments, a polarizing illumination distributor. In some embodiments, an additional polarizer (not shown) may be employed to enhance contrast of the image carried by filtered image-bearing light.

As shown schematically in FIGS. 4A-C, image generation apparatuses employing a non-polarizing illumination distributor 1300npol may include an input polarizer 1370 optically coupled with non-polarizing illumination distributor 1300npol such that waveguide-propagating illumination light 510npol incident onto input polarizer 1370 is polarized thereby and launched as polarized input (illumination) light 510pol into non-polarizing illumination distributor 1300npol for distributing the luminance of the polarized input illumination light along the main direction M to obtain polarized output illumination light 520pol of desired luminance distribution emanating from the output surface. As shown schematically in FIG. 4B, reflective image display device 1200r of an image generation apparatus 1002r is configured to modulate and reflect polarization-related characteristics of polarized output illumination light 520pol emanating from non-polarizing illumination distributor to obtain reflected polarization-modulated image-bearing light 530rpol.

As shown schematically in FIG. 4C, transmissive image display device 1200t of an image generation apparatus 1002t is configured to modulate and allow the transmission of polarization-related characteristics of polarized output illumination light 520pol emanating from non-polarizing illumination distributor to obtain transmitted polarization-modulated image-bearing light 530tpol. In the FIGS. 4B-C, non-polarizing OPFEs 1322npol are not shown to avoid unnecessarily obscuring the illustrations.

Figure 5A:
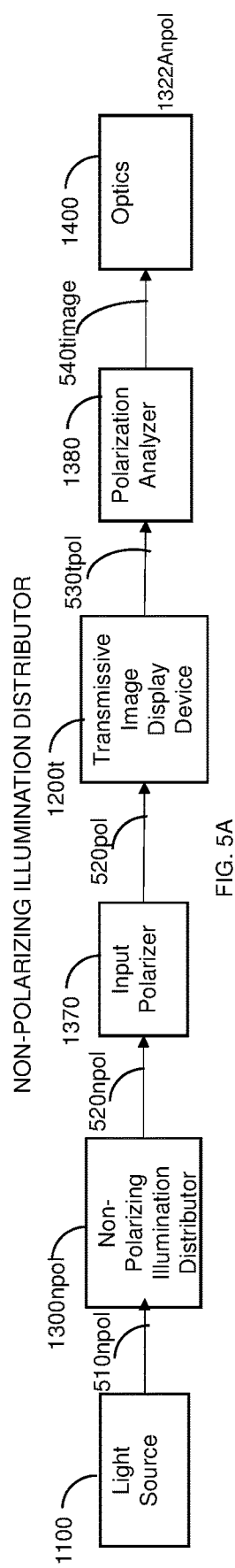
FIG. 5A is a diagram schematically illustrating an optical path in an optical system employing a non-polarizing illumination distributor, according to other embodiments.
Figure 5B:
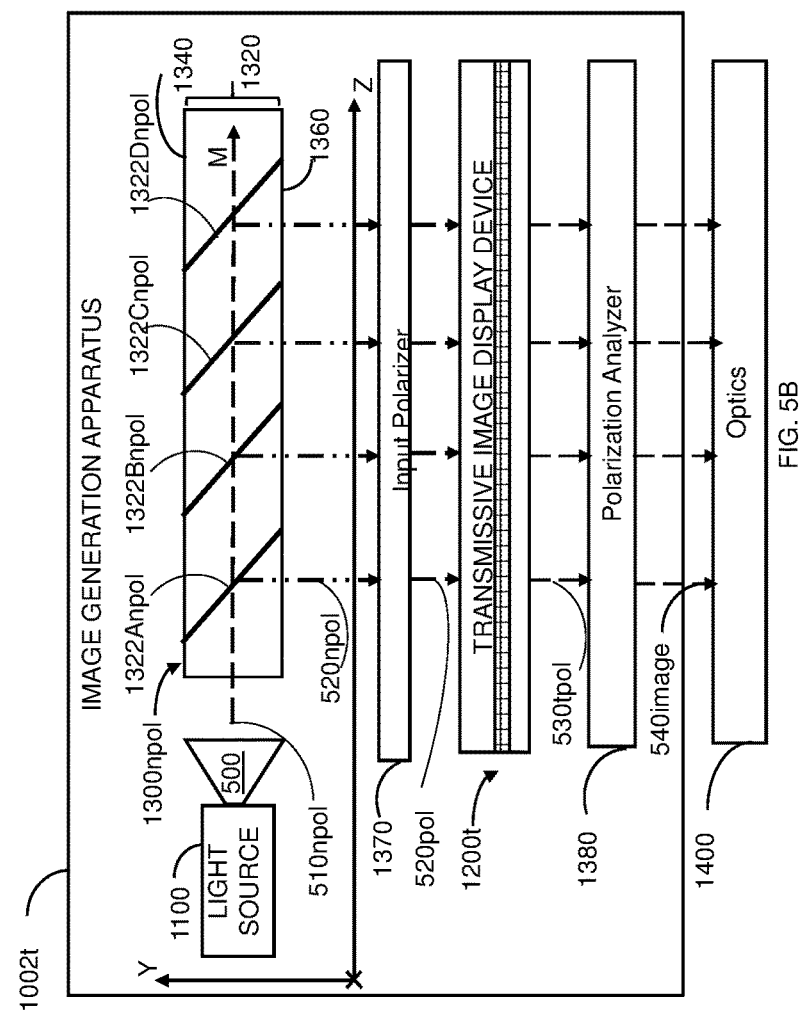
FIG. 5B is a schematic block diagram of an optical display system comprising an image generation apparatus employing a non-polarizing illumination distributor, according to the embodiment of FIG. 5A.

A polarization analyzer 1380 may be optically coupled with reflective or transmissive image display device 1200r/t to receive and filter reflected/transmitted image-bearing light 530rpol/tpol resulting in corresponding reflected/transmitted filtered image-bearing light 540rimage (FIG. 4B) or 540timage (FIG. 4C). As shown in FIG. 4B, polarization analyzer 1380 may be downstream optically coupled with front surface 1340 of illumination waveguide 1320, for example, to enhance contrast of image-bearing light emanating from the front or output surface 1340. As shown in FIG. 4C, polarization analyzer 1380 may be downstream optically coupled with transmissive image display device 1200t, for example, to enhance contrast of image-bearing light emanating from the transmissive image display device. The design of the optical display system dictates whether information of the desired image is carried in S- or P-polarization components of filtered image-bearing light. Filtered image-bearing light 540 may then be guided towards additional optics 1400. As shown schematically in FIGS. 5A and 5B, input polarizer 1370 may be optically arranged between non-polarizing illumination distributor 1300npol and transmissive image display device 1200t. Input polarizer 1370 receives unpolarized light 520npol from non-polarizing illumination distributor 1300npol and polarizes the light 520npol to generate polarized light 520pol which then propagates towards transmissive image display device 1200t for generating transmitted image-bearing light 530polt.

A polarization analyzer 1380 may be optically coupled with transmissive image display device 1200t to receive and filter the transmitted image-bearing light 530polt resulting in corresponding transmitted filtered image-bearing light 540timage. As described herein, the design of the optical display system dictates whether information of the desired image is carried in S- or P-polarization components of filtered image-bearing light. Filtered image-bearing light may then be guided or projected towards additional optics 1400.

Embodiments of non-polarizing illumination distributors may also include diffraction gratings on the output surface and/or non-polarizing OPFEs (e.g., non-polarizing beam splitters) configured to achieve, for example, increased transmissivity along the propagation direction of the light to achieve a desired (e.g., substantially uniform) luminance distribution of the light illuminating the image display device. Diffraction gratings may be employed when illuminating transmissive image display devices.

As mentioned herein above, image generation apparatuses may employ, in some embodiments, a polarizing illumination distributor. As shown schematically in FIGS. 6A and 6B, a polarizing illumination distributor 1300pol may comprise polarizing OPFEs 1322pol implemented, for example, as polarizing beam splitters. FIG. 6B shows an example configuration of an image generation apparatus 1004r in which a polarizing illumination distributor 1300pol is employed in conjunction with reflective image display device 1200r. In that case, polarizing beam splitters 1322pol (e.g., 1322A-D(pol)) also doubles or functions as polarization analyzers to generate filtered reflected image-bearing light 540rimage. Optionally, one or more additional analyzers may be employed downstream the polarizing beam splitters. Orientation of the analyzer(s) relative to the illumination distributor/reflective image display device/polarizing beam splitters is selected depending on whether the image information is encoded, primarily or exclusively, either in S- or P-polarized light emanating from the polarizing beam splitters.

Referring now to FIGS. 7A and 7B, a polarization analyzer 1380 may be disposed downstream polarizing illumination distributor 1300pol, i.e., to receive filter image-bearing light 540rimage emanating from the back surface. In the example illustrated schematically in FIGS. 7A and 7B, polarization analyzer 1380 of an image generation apparatus 1004t may be disposed downstream transmissive image display device 1200t to receive transmitted image-bearing light 530t emanating from transmissive image display device 1200t and to generate transmitted filtered image-bearing light 540tpol.

In cases where illumination distributor 1300 incorporates optical elements such as (e.g., linearly) polarizing beam splitters 1322 (e.g., Glan-Thompson polarizing beamsplitter (PBS) or semi-reflective surfaces having suitable polarization-imparting coatings for implementing a PBS), optical (e.g., elliptical) retarders or other optical elements (e.g., with elements having suitable coatings) may be employed downstream each polarizing beam splitter to obtain S and P components at a desired ratio with respect to the polarizing OPFE the "rotated" or "retarded" light subsequently impinges on. The optical retarder element for example is configured such that polarization direction of light emanating from a first polarizing beam splitter is altered to obtain S and P components before the light is incident onto a second polarizing beam splitter disposed arranged subsequent to the first beam splitter, such that such that again a desired portion of the light that is incident onto the subsequent beam splitter is deflected towards the display image device by the subsequently arranged polarizing beam splitter. The image generation apparatus can include an additional analyzer that is optically coupled with light emanating from the back surface. Orientation of the analyzer(s) relative to the illumination distributor/reflective image display device/polarizing beam splitters is selected depending on whether the image information is encoded in S- or P-polarized light emanating from the polarizing beam splitters.

In some embodiments, the series of polarizing beam splitters may be rotated relative to each other. For example, a series of Glan-Thompson PBS's may be rotated such to obtain the desired illumination intensity distribution.

Light incident onto the subsequent polarizing beam splitter (also: polarizing OPFE) has again "S" and "P" components such that desired amount of light incident onto the subsequent beam splitter is deflected towards the display image device by the consecutively arranged polarizing beam splitter.

Additional reference is made to FIG. 8. In some embodiments, some of the image-bearing light reflected into the light distributor may be deflected by its corresponding polarizing beam splitter towards adjacent and upstream located beam splitter in reverse direction relative to the main direction M. The reversely deflected light may then be deflected, by the upstream-located adjacent beam splitter, out of the back surface of the polarizing illumination distributor, inadvertently causing crosstalk between the reversely deflected image-bearing light deflected by and the reflected image-bearing light passing through the upstream-located adjacent beam splitter towards additional optics 1400.

FIG. 8 schematically shows crosstalk introduced between two adjacent OPFEs (which can act as non-polarizing or polarizing beam splitters) by reversely deflected image-bearing light portions 610. A portion of image-bearing light 530r2 reflected from reflective image display device 1200r is deflected backwards, i.e., in reverse direction relative to main direction M, by second OPFE 1322B towards first OPFE 1322A as reversely deflected image-bearing light portion 610. Second OPFE 1322B then further deflects reversely deflected image-bearing light portion 610, as deflected crosstalk image-bearing light 620, towards front surface 1340 in direction of the viewing region. In the described situation, reversely deflected image-bearing light portion 610 may introduce crosstalk into image-bearing light 530r1 reflected by reflective image display device 1200r towards first OPFE 1322A. Therefore, the term "crosstalk" as used herein pertains, for example, to introducing undesired information into image-bearing light that is reflected directly from the reflective image display device towards a given OPFE for passing through the given OPFE, without deflection, towards a viewing region. The unwanted image-bearing light originates from image-bearing light which is deflected towards the given OPFE by one or more OPFEs which are arranged downstream the given OPFE.

Figure 9A:
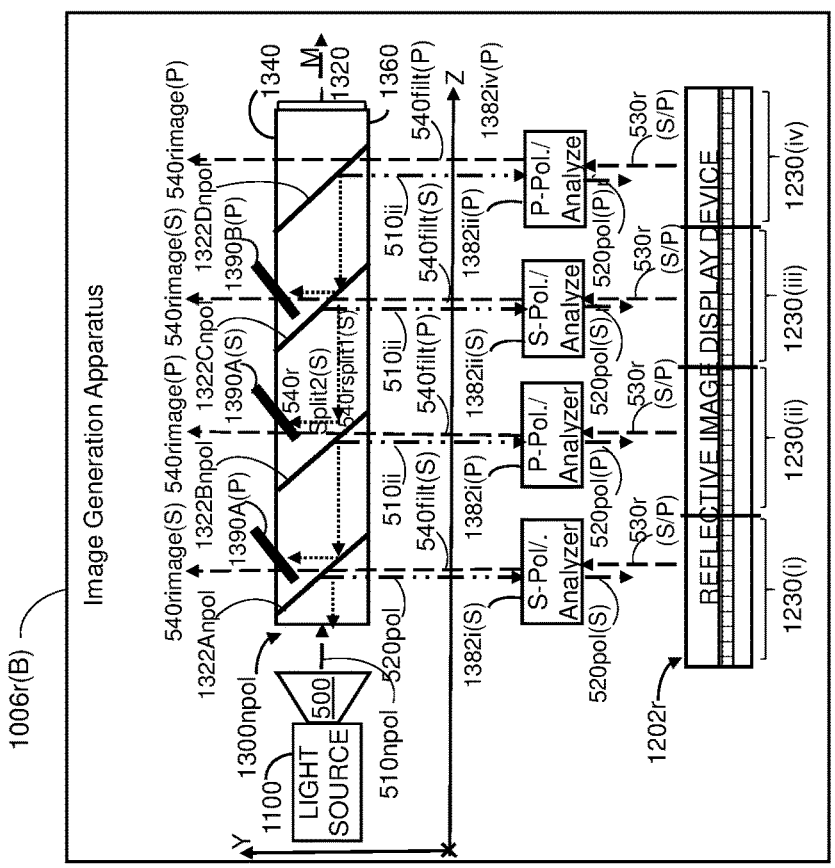
FIG. 9A is a schematic block diagram illustration of an optical display system employing a polarizing illumination distributor configured to reduce crosstalk in an image-bearing light path propagating towards the viewing region, according to some embodiments.

Turning now to FIG. 9A, crosstalk in polarizing illumination distributor of an image generation apparatus 1006r (A) can be reduced or prevented by ensuring that optical elements are configured to cause at least some or all of the reversely deflected light to pass through all of the upstream located beam splitters towards the input facet of the illumination waveguide. For example, retarder orientation relative to linearly polarized light components, the amount of retardation imparted on the incoming light, orientation of PBS's relative to each other, and/or the ratio of P/S components deflected towards the image display device may be configured to cause at least some or all of the reversely deflected light to pass through all of the upstream located beam splitters towards the input facet of the illumination waveguide.

The polarizing OPFEs 1322pol illustrated in FIG. 9A are configured such that image bearing light portions incident onto downstream arranged polarizing OPFE 1322pol pass through the upstream located polarizing OPFEs 1322pol towards input facet 1324 of illumination waveguide 1320 as reversely deflected image-bearing light 610, instead of being additionally deflected, by the upstream located polarizing OPFE(s) 1322*pol*, towards the viewing region as deflected crosstalk image-bearing light 620. For instance, the light polarization component which is orthogonal to the polarization component of reflected image bearing light 540*r* passes through the upstream located polarizing OPFEs 1322.

Reduction, minimization or avoidance of crosstalk in polarizing illumination distributors may be achieved by arranging the polarizing OPFEs such that adjacent polarizing OPFEs impart, for example, optical rotation on light passing therethrough. Thus, the plane of polarization of light responsively reflected from the reflective image display device may depend on the polarization orientation between adjacent polarizing OPFEs. This configuration can overcome or can reduce crosstalk at the output surface.

In some embodiments, a corresponding plurality of polarization analyzers 1380 (e.g., polarization analyzers 1380*pol* (A-D)) may be arranged downstream the output surface and optically coupled with the plurality of polarizing OPFEs 1322*pol*. Each one of the plurality of polarization analyzers 1380*pol* are oriented in accordance with the optical rotation imparted by the polarizing OPFE on reversely deflected image-bearing light. The employment of a plurality of polarization analyzers downstream the distributor may also be applicable in conjunction with configurations in which no crosstalk correction is employed, e.g., to enhance contrast.

Combining crosstalk correction with polarization analyzers downstream the distributor may further improve contrast on the reflected image-bearing light. The employment of polarization analyzers along with configurating the optical elements (e.g., PBS front facets) to let reverse-reflected image bearing light portion pass towards input facet 1324 may come at the expense of reduced output power.

Figure 9B:
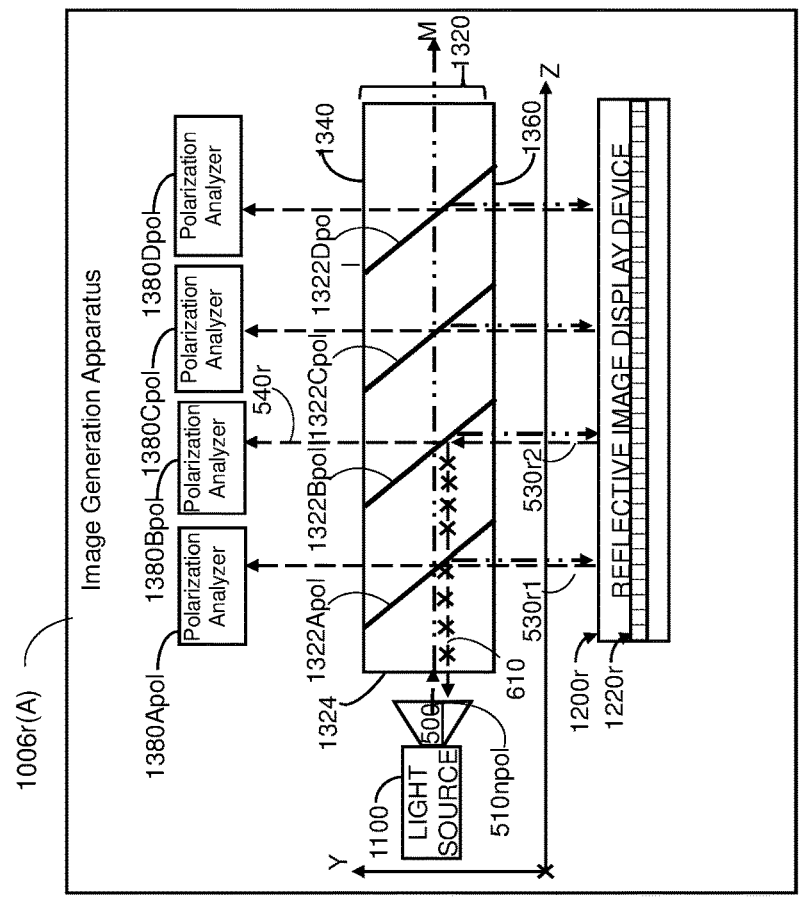
FIG. 9B is a schematic block diagram illustration of an optical display system employing a non-polarizing illumination distributor configured to reduce crosstalk in an image-bearing light path propagating towards the viewing region, according to other embodiments.

Further referring to FIG. 9B, crosstalk in a non-polarizing illumination distributor of an image generation apparatus 1006*r*(B) may be reduced by employing the configuration described in the following. A reflective image display device 1202*r* of image generation apparatus 1006*r*(B) may be partitioned, along the main direction M, into a plurality of alternate and adjacent S and P-modulating reflective display regions (e.g., reflective display regions 1230(*i*)-1230(*iv*)). Reflective display regions 1230 are configured and selectively controllable to modulate either S or P-polarized light 520*pol*(S) or 520*pol*(P) incident thereon for generating correspondingly reflected polarized image bearing light 530*r*(S/P). S or P-polarized light 520*pol*(S) or 520*pol*(P) may be generated by a corresponding alternate arrangement of S- and P-polarizers/analyzers 1382 (e.g., S-P-S-P or P-S-P-S). A Polarizer/Analyzer may be implemented as a single component or as separate input polarizer and output analyzer components.

For example, unpolarized light 510*ii* coming from first non-polarizing OPFE 1322Anpol is incident onto first S-polarizer/analyzer 1382*i*(S) which responsively generates S-polarized light 520*pol*(S) that is then incident onto first reflective display region 1230(*i*). Further, unpolarized light 510*ii* coming from second non-polarizing OPFE 1322Bnpol is incident onto first P-Polarizer/analyzer 1382*i*(P) which responsively generates P-polarized light 520*pol*(P) that is then incident onto second reflective display region 1230(*ii*). In addition, unpolarized light 510*ii* coming from third non-polarizing OPFE 1322Bnpol is incident onto second S-polarizer/analyzer 1382*ii*(S) which responsively generates S-polarized light 520*pol*(S) that is then incident onto third reflective display region 1230(*iii*), and light 510*iv* coming from fourth non-polarizing OPFE 1322Dnpol is incident onto second P-Polarizer/analyzer 1382*ii*(P) which responsively generates P-polarized light 520*pol*(P) that is then incident onto fourth reflective display region 1230(*iv*). The pixels of the plurality of reflective display regions 1230 are configured and selectively controllable to modulate (e.g., rotate) the S- or P-polarized light to generate the correspondingly S/P-polarized image bearing light 530*r*(S/P). The S/P-polarized image bearing light 530*r*(S/P) is reflected towards the corresponding S-or P-polarizer/analyzer 1382. In the return path, the corresponding S- or P-Polarizer/analyzer 1382 filters the reflected S/P-polarized image bearing light 530*r*(S/P) to generate filtered S- or P-polarized image bearing light 530*r*(S/P). The filtered S- or P-polarized image bearing light 530*r*(S/P) is incident onto the non-polarizing beamsplitters 1322.

The reduction in crosstalk is herein exemplified with respect to the optical return path originating from third reflective display region 1230(*iii*). As already described herein, S/P-polarized image bearing light 530(S/P) reflected from third reflective display region 1230(*iii*) is filtered by S-polarizer/analyzer to generate filtered S-polarized image bearing light 540*filt*(S). The filtered S-polarized image bearing light 540*filt*(S) is incident onto third non-polarizing beamsplitter 1322Cnpol splitting filtered S-polarized image bearing light 540*filt*(S) into image bearing light 540*rimage*(S) and into reversely deflected light 540*split*1(S). S-polarized Image bearing light 540*rimage*(S) emanates from output surface 1340 towards optics 1400, and some of the reversely deflected S-polarized light 540*split*1(S) is additionally deflected, by preceding second non-polarizing beamsplitter 1322Bnpol, towards the output surface 1340.

Optionally, a S-polarization blocking filter 1390 may be employed to further reduce crosstalk by blocking propagation of S-polarized light split by the preceding second non-polarizing beamsplitter 1322Bnpol in a P-polarized image bearing light return path towards output surface 1340, thereby reducing crosstalk The S-polarizing filter 1390 may be arranged prior or after the output surface 1340. Analogously, P-polarizing filters may be arranged prior or after the output surface 1340 for blocking the propagation of P-polarized light in an S-polarized image bearing light return path towards output surface 1340.

Generally, a S-polarization blocking filter 1390 may be employed to prevent S-polarized image bearing light from further propagating in a P-polarized image bearing return path towards the output surface, and an P-polarization blocking filter 1390 may be employed to prevent P-polarized image bearing light from further propagating in a S-polarized image bearing return path towards the output surface.

The image generation apparatus 1006R may thus include an alternate arrangement of S-polarization and P-polarizing blocking filters, which are employed and arranged in accordance with the alternate and adjacent S and P-modulating reflective display regions. For example, in an S-P-S-P arrangement of modulating reflective display regions, an arrangement of P-S-P-S blocking filters is employed.

In some embodiments, the same illumination distributor may employ polarizing and non-polarizing beamsplitters. For example, an illumination distributor may comprise one or more sequentially arranged non-polarizing beamsplitters followed, in the main propagation direction, by one or more sequentially arranged polarizing beamsplitters. Polarizers and analyzers may be employed in correspondence with the arrangement of the non-polarizing and polarizing beamsplitters. In another example, an illumination distributor may comprise one or more sequentially arranged polarizing beamsplitters followed, in the main propagation direction, by one or more sequentially arranged non-polarizing beamsplitters. In the latter example, the polarization of light may be scrambled by depolarizers to obtain unpolarized light (also: quasi-unpolarized light) for launching thereof into non-polarizing beamsplitters. Such depolarizers may include, for example, wedge depolarizers, Lyot depolarizers, etc.

In some embodiments, two or more illumination distributors (polarizing and/or non-polarizing) may be arranged in series to create an illumination distributor assembly. The plurality of illumination distributors are arranged such that their main optical axes are aligned with each other.

Figure 10:
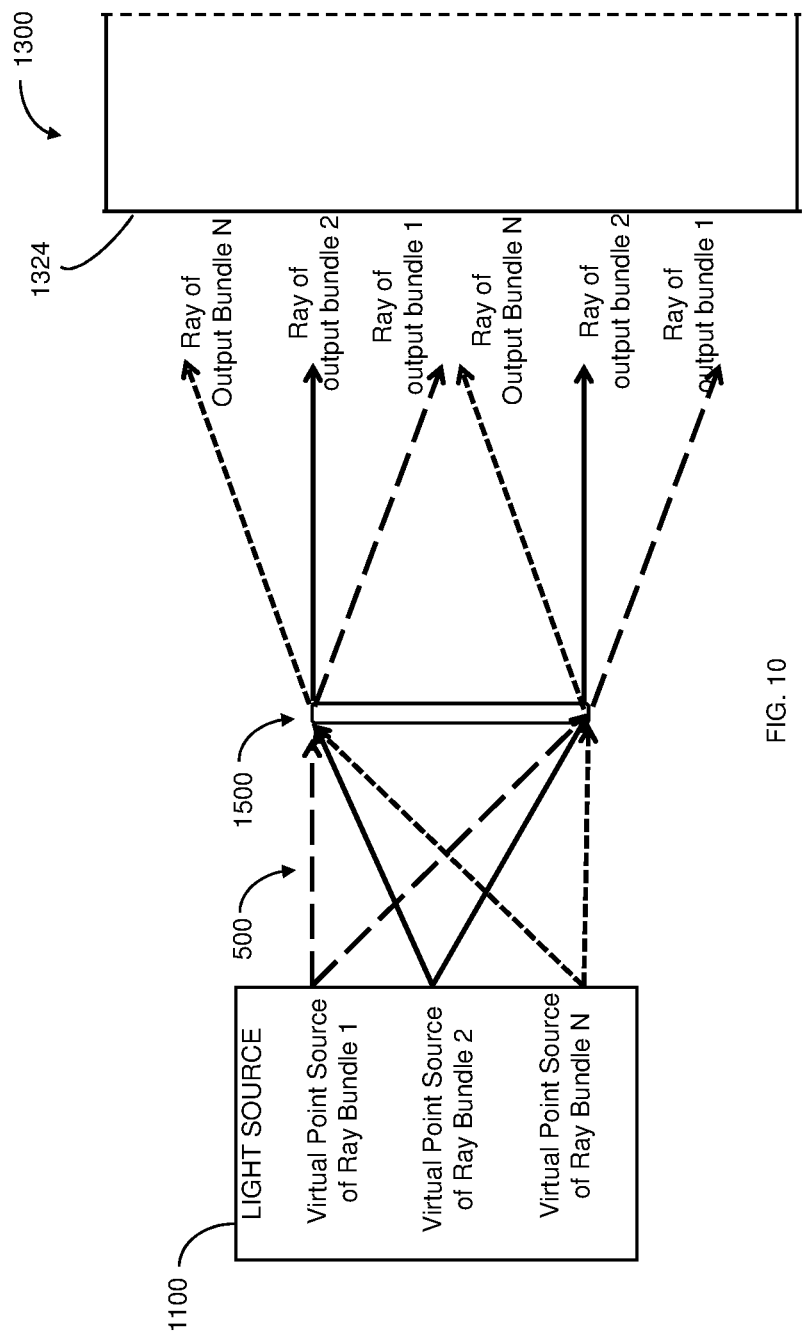
FIG. 10 is a schematic illustration of collimating optics arranged between a light source and a illumination distributor of an image generation apparatus to show, schematically, the collimation of light ray bundles by the collimating optics, according to some embodiments.

In some embodiments, collimating optics (not shown) may be employed for generating collimated image-bearing light for the coupling thereof into illumination distributor 1300. For example, as shown schematically in FIG. 10, image generation apparatus 1000 may comprise collimating optics 1500 that is operably arranged between light source 1100 and illumination distributor 1300 and which is configured to collimate light emitted by light source 1100 such that a bundle of source light rays originating from a virtual point source (1, 2, . . . , N) of light source 1100 is collimated by collimating optics 1500 to generate a corresponding collimated bundle of output light rays that is incident onto input facet 1324 of illumination distributor 1300. For example, as illustrated schematically in FIG. 10, the light rays respective of the source bundles 1 to N are collimated by collimating optics 1500 and then incident as collimated output bundles 1 to N onto input facet 1324 of illumination distributor 1300. Collimated light is launched at angles into illumination distributor 1300 such to achieve TIR to ensure propagation of the light in the illumination distributor. Propagation of collimated bundles of rays 1, 2 and N entering illumination distributor 1300 and reflected from image display device 1200r towards additional optics is shown schematically in FIGS. 11A-C.

In some embodiments, diffraction gratings may be employed for distributing the luminance of input illumination light along the main direction M of the display illumination optics to provide, along the main direction M, output illumination light of desired (e.g., uniform) luminance. In this way, the illuminance of output illumination light incident onto image display device 1200 may have correspondingly desired intensity. These diffraction gratings, which may be disposed on either front surface 1340, back surface 1360, or both, may be at least partially transparent or fully transparent for diffracting at least some of the light that is propagating in TIR within illumination waveguide 1320 towards reflective image display device 1200r. To achieve, for example, uniform illuminance of light incident onto image display device 1200, the diffraction gratings may be configured to have gradually increasing diffraction efficiency in direction of propagation of light emitted by light source 1100. In some embodiments, partially transparent diffraction gratings may be implemented as anti-reflective diffraction gratings. In some embodiments, the diffraction gratings may be implemented as volume holographic gratings.

In embodiments, the display illumination optics may comprise a light coupling structure for coupling illuminating light that emitted by the light source, e.g., by total internal reflection (TIR) into illumination waveguide 1320. As for example schematically illustrated in FIG. 12A, a light coupling structure 1400A may comprise a coupling prism 1410A that is operably coupled with illumination waveguide 1320. Light source 1100 may be optically coupled with coupling prism 1410A such that illuminating light emitted by light source 1100 is introduced into coupling prism 1410A and for deflection by a deflecting prism surface 1412A into illumination waveguide 1300 to propagate therein, e.g., in TIR.

FIG. 12B schematically illustrates another example in which a coupling structure 1400B is integrally formed with illumination waveguide 1300. Light emitted by light source 1100 is refracted by an input surface 1410B of coupling structure 1400B to cause input illumination light 500 to propagate in, e.g., TIR, in illumination waveguide 1320 as waveguide-propagating illumination light 510.

In some embodiment, the coupling structure comprises a diffraction grating (not shown).

Figure 13:
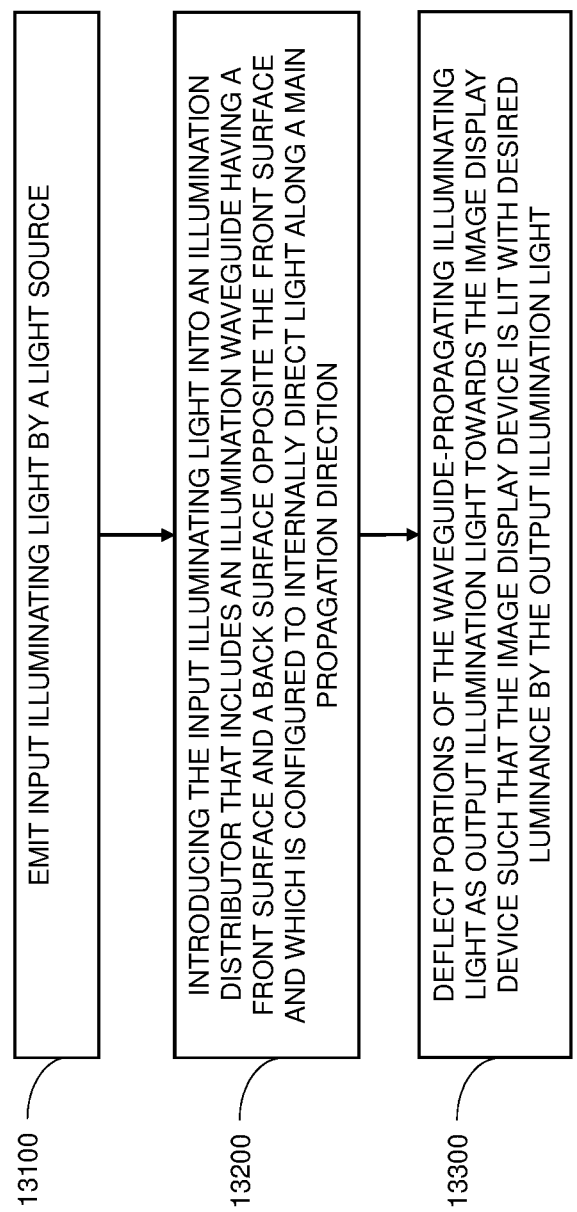
FIG. 13 is a flowchart of a method for illuminating an image display device of an image generation device with desired illumination distribution, according to some embodiments.

Additional reference is made to FIG. 13. According to some embodiments, a method for illuminating an image display device includes, as indicated by block 13100, emitting input illumination light 500.

As indicated by block 13200, the method further includes introducing the input illuminating light into an source illumination distributor that includes an illumination waveguide having a front surface and a back surface opposite the front surface and which is configured to internally direct light (e.g., in TIR) along a main direction M.

As indicated by block 13300, the method further includes deflecting portions of the waveguide-propagating illuminating light (e.g., by the by the plurality of OPFEs or diffracting gratings) as output illumination light towards the image display device at a desired (e.g., uniform) luminance such that the image display device is lit with the correspondingly desired (e.g., uniform) illuminance by the output illumination light.

Figure 14:
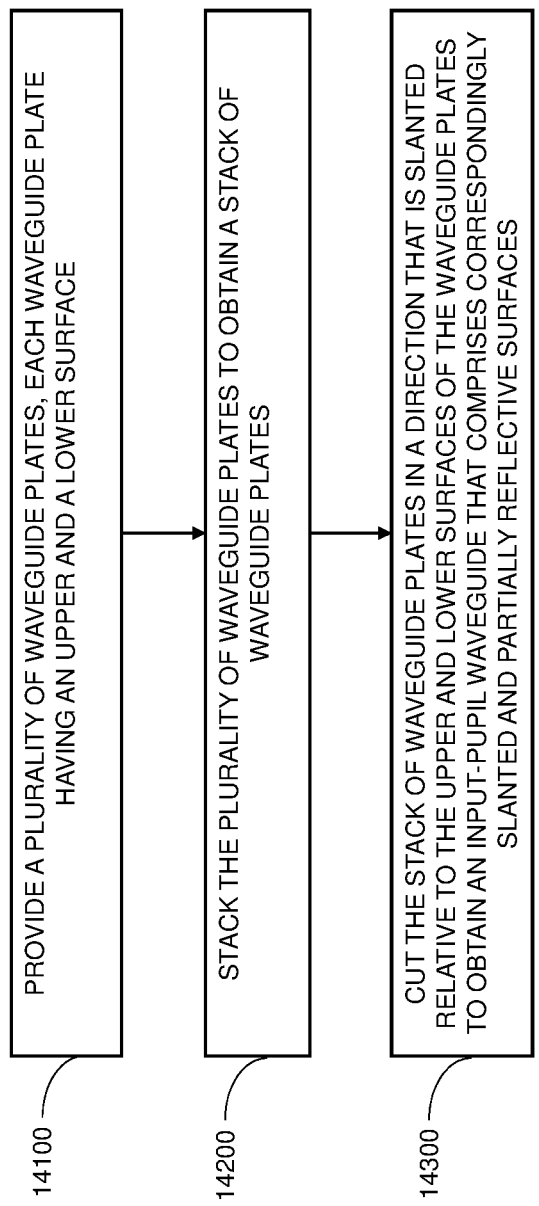
FIG. 14 is flowchart of a method for manufacturing a source illumination distributor, according to some embodiments.

Further referring to FIG. 14, a method of manufacturing an illumination waveguide that is configured to illuminate an image display device may comprise, as indicated by block 14100, providing a plurality of waveguide plates, each waveguide plate having an upper and a lower surface.

As indicated by block 14200, the method of manufacturing the illumination waveguide may further comprise stacking the plurality of waveguide plates to obtain a stack of waveguide plates.

As indicated by block 14300, the method of manufacturing the illumination waveguide may comprise cutting the stack of waveguide plates in a direction that is slanted relative to the upper and lower surfaces of the waveguide plates, to obtain an illumination waveguide that comprises correspondingly slanted partially reflective surfaces.

Additional reference is made to FIG. 15. As indicated by block 15100, a method of manufacturing an illumination waveguide according to some other embodiments may comprise, for example, providing a waveguide slab having a front and back surface.

As indicated by block 15200, the method may further comprise disposing diffraction gratings on the front and/or the back surface of the waveguide slab that have a gradually increasing diffraction efficiency along a main direction M.

ADDITIONAL EXAMPLES

Example 1 includes display illumination optics for illuminating an image display device of an image generation apparatus, the display illumination optics comprising: a source illumination distributor that includes an illumination waveguide having a front surface and a back surface opposite the front surface and configured to internally direct light along a main direction, wherein the illumination waveguide is configured to distribute the luminance of input illumination light launched into the illumination waveguide and propagating therein as waveguide-propagating illumination light along the main direction of the display illumination optics to obtain at the front surface, along the main direction, output illumination light of desired luminance distribution. Optionally, the illumination waveguide is further configured such that image-bearing light reflected from the image display device is directed towards the back surface to propagate through the illumination waveguide to emanate from the front surface.

Example 2 includes the subject matter of example 1 and, optionally, wherein the illumination waveguide comprises a plurality of partially reflective surfaces configured to let pass therethrough a portion of waveguide-propagating illumination light along the main direction and further configured to reflect a portion of waveguide-propagating illumination light coupled inside the illumination waveguide through the back surface towards an image display device for illumination thereof.

Example 3 includes the subject matter of Example 1 or Example 2 and, optionally, wherein the plurality of partially reflective surfaces are slanted relative to the front and back surface.

Example 4 includes the subject matter of any one of the Examples 1 to 3 and, optionally, wherein the plurality of partially reflective surfaces are configured reflect portions of light that is propagating in total internal reflection (TIR) through the back surface towards the image display device.

Example 5 includes the subject matter of any one of the Examples 1 to 4 and, optionally, wherein the illumination waveguide comprises at least 2, at least 3, at least 4, at least 5, at least 10, or at least 20, partially reflective surfaces.

Example 6 includes the subject matter of any one of the examples 2 to 5 and, optionally, wherein the plurality of partially reflective surfaces are polarizing or non-polarizing beam splitters.

Example 7 includes the subject matter of example 6 and, optionally, an optical retarder that is arranged between each two adjacent polarizing beam splitters and which is configured to change polarization of light emanating from a first polarizing beam splitter of the two adjacent polarizing beam splitters is changed before the light is incident onto a second polarizing beam splitter disposed downstream the first polarizing beam splitter such that such that a desired portion of the light incident onto the second polarizing beam splitter is deflected towards the display image device by the second polarizing beam splitter arranged downstream the first polarizing beam splitter.

Example 8 includes the subject matter of example 7 and, optionally, wherein a polarizing beamsplitter that receives light reflected from the reflective image display device deflects the reflected light as reversely deflected image-bearing light towards the one or more beam splitters which are arranged upstream the deflecting beam splitter, and which one or more upstream arranged beam splitters are configured to allow the reversely deflected image-bearing light pass therethrough further towards the input facet of the illumination waveguide to reduce or prevent crosstalk.

Example 9 includes the subject matter of any one of the examples 2 to 8 and, optionally, wherein the illumination waveguide comprises an output surface diffraction grating that is configured to diffract the input illumination out of the output surface to obtain output illumination light propagating towards the image display device and illuminating the image display device with desired luminance distribution.

Example 10 includes the subject matter of any one of the examples 2 to 9, wherein input illumination light that is propagating in TIR in the illumination waveguide is diffracted or deflected through the output surface towards the image display device.

Example 11 includes the subject matter of any one of the examples 1 to 10 and, optionally, wherein the illumination waveguide has a length and width substantially matching or exceeding the length and/or width of the image display device.

Example 12 includes the subject matter of any one of the examples 1 to 11 and, optionally, a light coupling structure for coupling light emitted by a light source by total internal reflection (TIR) into the illumination waveguide.

Example 13 includes the subject matter of example 12 and, optionally, wherein the light coupling structure comprises a coupling prism.

Example 14 includes the subject matter of any one of the examples 1 to 13 and, optionally, wherein the light source is configured to emit light in one or more wavelengths.

Example 15 includes the subject matter of any one of the examples 12 to 14 and, optionally, wherein the light source is configured to emit white light Example 16 includes an image generation apparatus for emitting image-bearing light, the image generation apparatus comprising: an image display device; and display illumination optics for illuminating the image display device, the display illumination optics comprising: an illumination waveguide having a front surface and a back surface opposite the front surface and configured to internally direct light along a main direction between the front and back surface, wherein the illumination waveguide comprises a plurality of partially reflective surfaces configured to let pass therethrough a portion of waveguide-propagating illumination light along the main direction and further configured to reflect a portion of waveguide-propagating illumination light coupled inside the illumination waveguide from the back surface towards the image display device for illumination thereof.

Example 17 includes the subject matter of example 16 and, optionally, wherein the plurality of partially reflective surfaces of the illumination waveguide are slanted relative to the front and back surfaces of the illumination waveguide.

Example 18 includes the subject matter of the examples 16 or 7 and, optionally, wherein the image display device comprises one of the following: a reflective display, and a transmissive display.

Example 19 includes the subject matter of example 18 and, optionally, wherein the reflective display is based on a liquid crystal on silicon display, or based on a digital micromirror device; and wherein the transmissive display is implemented based on ferroelectric liquid crystals.

Example 20 includes the subject matter of any one of the examples 16 to 19 and, optionally, wherein the image generation apparatus further comprises: an input polarizer for generating S- or P-polarized light; a reflective image display device comprising an alternate arrangement of at least one S- and P-modulating reflective display region that is configured and selectively controllable for generating correspondingly reflected S/P polarized image bearing light; an S- or P-output polarizer for generating filtered S- or P-polarized image bearing light; and at least one first P-polarization blocking filter which is arranged to block, in an S-polarized image bearing return path, the propagation of P-polarized light towards the output surface, and/or an S-polarization blocking filter which is arranged to block, in an P-polarized image bearing return path, the propagation of S-polarized light towards the output surface.

Example 21 includes a method for illuminating an image display device of an image generation apparatus, the method comprising: emitting input illuminating light by a light source; introducing the input illuminating light into a source illumination distributor that includes an illumination waveguide having a front surface and a back surface opposite the front surface and which is configured to internally direct light along a main direction; and deflecting portions of the waveguide-propagating illuminating light towards the image display device as output illumination light such that the image display device is lit with desired illuminance by the output illumination light. Optionally, the method comprises deflecting, with partially reflective surfaces or diffractive gratings, portions of waveguide-propagating illuminating light towards the image display device as output illumination light such that the image display device is lit with desired illuminance by the output illumination light to responsively generate image-bearing light that is reflected from the image display device towards the back surface, and such that the reflected image-bearing light further propagates through the partially reflective surfaces or diffractive gratings to emanate from the front surface of the illumination waveguide Example 22 includes the subject matter of Example 21 and, optionally, wherein deflecting portions of the waveguide-propagating illuminating light is performed by a plurality of partially reflective surfaces or by diffraction gratings.

Example 23 includes the subject matter of the Examples 21 and 22 and, optionally, further comprising generating image-bearing light by the image display device and directing the image-bearing light towards additional optics.

Example 24 includes the subject matter of example 23 and, optionally, wherein generating the image-bearing light includes modulating output illumination light by a transmissive or reflective image display device.

Example 25 includes the subject matter of the examples 23 or 24 and, optionally, further comprising directing the image-bearing light towards the additional optics by reflecting the image-bearing light from the reflective image display device through the illumination waveguide.

Example 26 includes a method for manufacturing an illumination waveguide that is configured to illuminate an image display device, the method comprising: providing a plurality of waveguide plates, each waveguide plate having an upper and a lower surface; stacking the plurality of waveguide plates to obtain a stack of waveguide plates; and cutting the stack of waveguide plates in a direction that is slanted relative to the upper and lower surfaces of the waveguide plates to obtain an input pupil waveguide that comprises correspondingly slanted and partially reflective surfaces.

Example 27 includes a method for manufacturing an illumination waveguide that is configured to illuminate an image display device, the method comprising: providing a waveguide slab having a front and back surface; and disposing diffraction gratings on the front and/or the back surface of the waveguide slab, wherein the diffraction gratings have a gradually increasing diffraction along a main direction of light propagating in the waveguide slab.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

"Coupled with" can mean indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

It should be noted that where an embodiment refers to a condition of "above a threshold", this should not be construed as excluding an embodiment referring to a condition of "equal or above a threshold". Analogously, where an embodiment refers to a condition "below a threshold", this should not to be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made. Further, the use of the expression "and/or" may be used interchangeably with the expressions "at least one of the following", "any one of the following" or "one or more of the following", followed by a listing of the various options.

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the term "exemplary" is used herein to refer to examples of embodiments and/or implementations, and is not meant to necessarily convey a more-desirable use-case.

It is noted that the terms "in some embodiments", "according to some embodiments", "for example", "e.g.", "for instance" and "optionally" may herein be used interchangeably.

The number of elements shown in the Figures should by no means be construed as limiting and is for illustrative purposes only.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Where applicable, whenever a numerical range is indicated herein, it is meant to include any cited numeral (fractional or integral) within the indicated range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

Positional terms such as "upper", "lower" "right", "left", "bottom", "below", "lowered", "low", "top", "above", "elevated", "high", "vertical" and "horizontal" as well as grammatical variations thereof as may be used herein do not necessarily indicate that, for example, a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

As used herein, if a machine (e.g., a processor) is described as "configured to" perform a task (e.g., configured to cause application of a predetermined field pattern), then, at least in some embodiments, the machine may include components, parts, or aspects (e.g., software) that enable the machine to perform a particular task. In some embodiments, the machine may perform this task during operation.

It is noted that the terms "configured to" can in some embodiments embrace a mere capability to perform the function and, in some other embodiments, a machine that is actually made to perform the function.

While the invention has been described with respect to a limited number of embodiments, these should not be construed as limitations on the scope of the invention, but rather as exemplifications of some of the embodiments.

What is claimed is:

1. Display illumination optics for illuminating an image display device of an image generation apparatus, the display illumination optics comprising: a source illumination distributor that includes an illumination waveguide having a front surface and a back surface opposite the front surface, the illumination waveguide internally directs light along a main direction, wherein the illumination waveguide comprises a plurality of partially reflective surfaces extending between the front and the back surface that distribute the luminance of input illumination light launched into the illumination waveguide and propagating therein as waveguide-propagating illumination light along the main direction of the display illumination optics to obtain at the back surface, along the main direction, output illumination light of uniform or substantially uniform luminance distribution for uniformly or substantially uniformly illuminating the image display device in order to modulate the output illumination light to generate image-bearing light; wherein the light that is entering the waveguide is sequentially split by the plurality of partially reflective surfaces for directing a first split light portion along the main direction and a second split light portion towards the image display device; such that part of the image-bearing light reflected from the image display device is directed towards the back surface to reversely propagate through the-partially reflective surfaces, which are inclined relative to the back surface and the front surface, to emanate from the front surface.

2. The display illumination optics of claim 1, wherein the plurality of partially reflective surfaces are slanted relative to the front surface and the back surface.

3. The display illumination optics of claim 1, wherein the plurality of partially reflective surfaces reflect portions of light that is propagating in the illumination waveguide in total internal reflection (TIR) through the back surface towards the image display device.

4. The display illumination optics of claim 1, wherein the plurality of partially reflective surfaces are polarizing or non-polarizing beam splitters.

5. The display illumination optics of claim 1, wherein input illumination light that is propagating in TIR in the illumination waveguide is deflected through the back surface towards the image display device.

6. The display illumination optics of claim 1, wherein the illumination waveguide has a length and width substantially matching the length and width of the image display device.

7. The display illumination optics of claim 1, further comprising a light coupling structure for coupling light emitted by a light source by total internal reflection (TIR) into the illumination waveguide.

8. The display illumination optics of claim 1, wherein the plurality of partially reflective surfaces let pass therethrough a portion of waveguide propagating illumination light along the main direction in order to reflect a portion of waveguide-propagating illumination light coupled inside the illumination waveguide through the back surface towards an image display device for illumination thereof.

9. The display illumination optics of claim 4, further comprising an optical retarder that is arranged between each two adjacent polarizing beam splitters of a plurality of beam splitters to change polarization of light emanating from a first polarizing beam splitter of the two adjacent polarizing beam splitters before the light is incident onto a second polarizing beam splitter disposed downstream the first polarizing beam splitter such that a desired portion of light incident onto the second polarizing beam splitter is deflected towards the display image device by the second polarizing beam splitter arranged downstream the first polarizing beam splitter.

10. The display illumination optics of claim 4, further comprising a polarization analyzer that is optically coupled with light emanating from the front surface.

11. The display illumination optics of claim 7, wherein the light source emits light in one or more wavelengths.

12. The display illumination optics according to claim 7, wherein the light source emits white light.

13. An image generation apparatus for emitting image-bearing light, the image generation apparatus comprising: an image display device; and display illumination optics for illuminating the image display device, the display illumination optics comprising: an illumination waveguide having a front surface and a back surface opposite the front surface in order to internally direct light along a main direction between the front surface and the back surface, wherein the illumination waveguide comprises a plurality of partially reflective surfaces extending between the front and the back surface in order to distribute the luminance of input illumination light launched into the illumination waveguide and propagating therein as waveguide-propagating illumination light along the main direction of the display illumination optics to obtain at the back surface, along the main direction, output illumination light of uniform or substantially uniform luminance distribution for uniformly or substantially uniformly illuminating the image display device in order to modulate the output illumination light to generate image-bearing light; wherein the light that is entering the waveguide is sequentially split by the plurality of partially reflective surfaces for directing first split light portions along the main direction and second split light portions towards the image display device; and in the image generation apparatus part of the image-bearing light reflected from the image display device is directed towards the back surface to reversely propagate through the partially reflective surfaces, which are inclined relative to the back surface and the front surface, to emanate from the front surface.

14. The image generation apparatus of claim 13, wherein the plurality of partially reflective surfaces of the illumination waveguide are slanted relative to the front surface and the back surface of the illumination waveguide.

15. The image generation apparatus of claim 13, wherein the plurality of partially reflective surfaces are polarizing or non-polarizing beam splitters.

16. The image generation apparatus of claim 13, wherein the image generation apparatus comprises: an input polarizer for generating S- or P-polarized light; a reflective image display device comprising an alternate arrangement of at least one S and P-modulating reflective display region that is selectively controllable for generating correspondingly reflected S/P polarized image bearing light; an S- or P-output polarizer for generating filtered S- or P-polarized image bearing light; and at least one first P-polarization blocking filter which is arranged to block, in an S-polarized image bearing return path, the propagation of P-polarized light towards the output surface, and/or an S-polarization blocking filter which is arranged to block, in an P-polarized image bearing return path, the propagation of S-polarized light towards the output surface.

17. The image generation apparatus of claim 15, further comprising an optical retarder that is arranged between each two adjacent polarizing beam splitters of a plurality of beam splitters in order to change polarization of light emanating from a first polarizing beam splitter of the two adjacent polarizing beam splitters before the light is incident onto a second polarizing beam splitter disposed downstream the first polarizing beam splitter such that a desired portion of light incident onto the second polarizing beam splitter is deflected towards the display image device by the second polarizing beam splitter arranged downstream the first polarizing beam splitter.

18. The image generation apparatus of claim 15, further comprising a polarization analyzer that is optically coupled with light emanating from the front surface.

19. A method for illuminating an image display device of an image generation apparatus, the method comprising: emitting input illuminating light by a light source;
introducing the input illuminating light into a source illumination distributor that includes an illumination waveguide having a front surface and a back surface opposite the front surface and which internally directs light along a main direction; deflecting, with a plurality of partially reflective surfaces extending between the front and the back surface, portions of waveguide-propagating illuminating light towards the image display device as uniform or substantially uniform output illumination light such that the image display device is lit with uniform or substantially uniform illuminance by the output illumination light to responsively generate image-bearing light that is reflected from the image display device towards the back surface, wherein the light that is entering the waveguide is sequentially split by the plurality of partially reflective surfaces for directing first split light portions along the main direction and second split light portions towards the image display device; and wherein part of the reflected image-bearing light further propagates through the partially reflective surfaces, which are inclined relative to the back surface and the front surface, to emanate from the front surface of the illumination waveguide.

20. The image generation apparatus of claim 13, wherein the display device comprises a reflective display.

* * * * *